April 14, 1942.  C. R. JOHNSON ET AL  2,279,323
MANUFACTURE AND PACKETING OF DETONATORS
Filed May 17, 1940  11 Sheets-Sheet 1
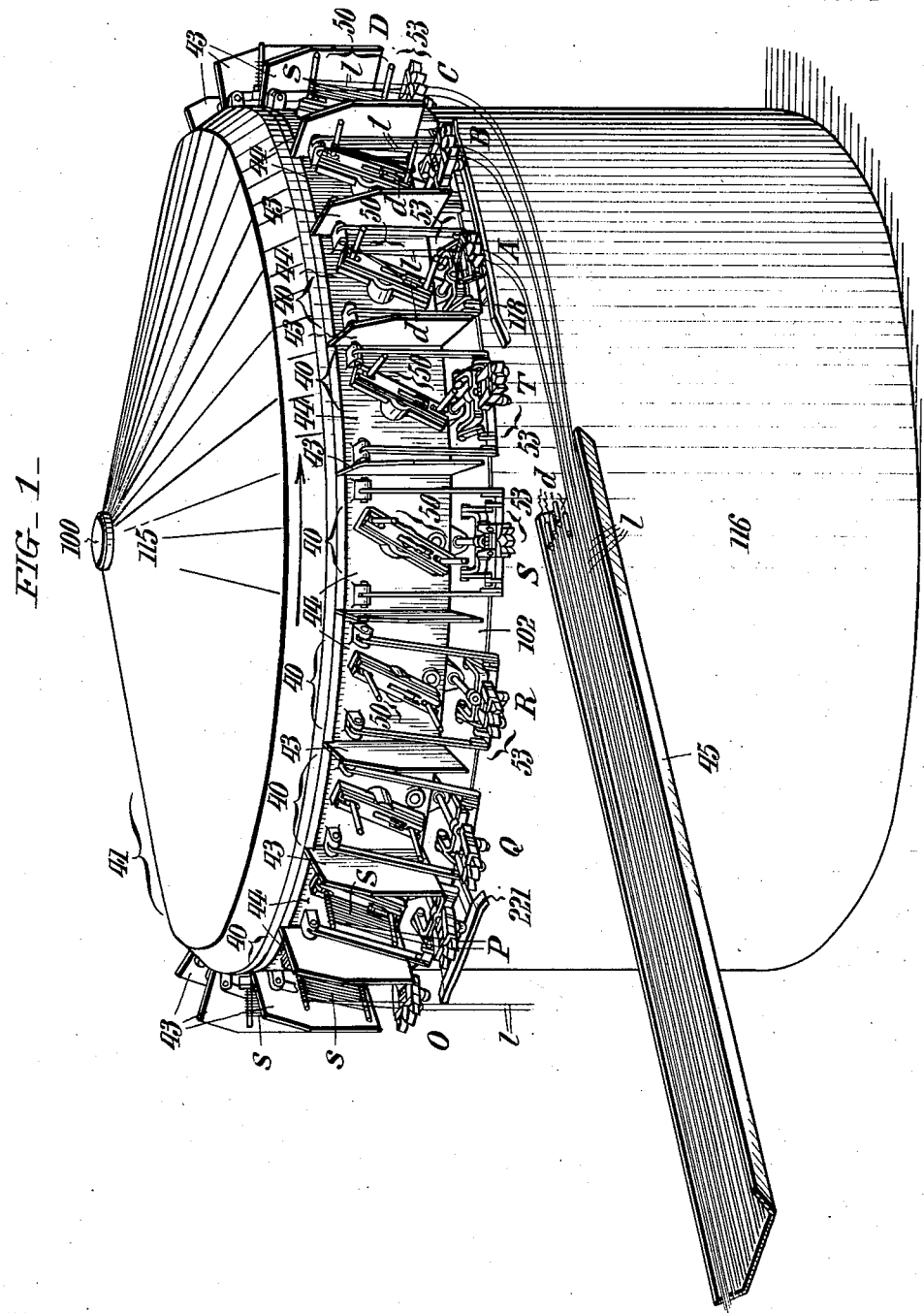
WITNESSES:
Hubert Fuchs
William Bell, Jr.
INVENTORS:
Charles R. Johnson &
Edward H. Baughman,
BY Paul o Paul
ATTORNEYS.

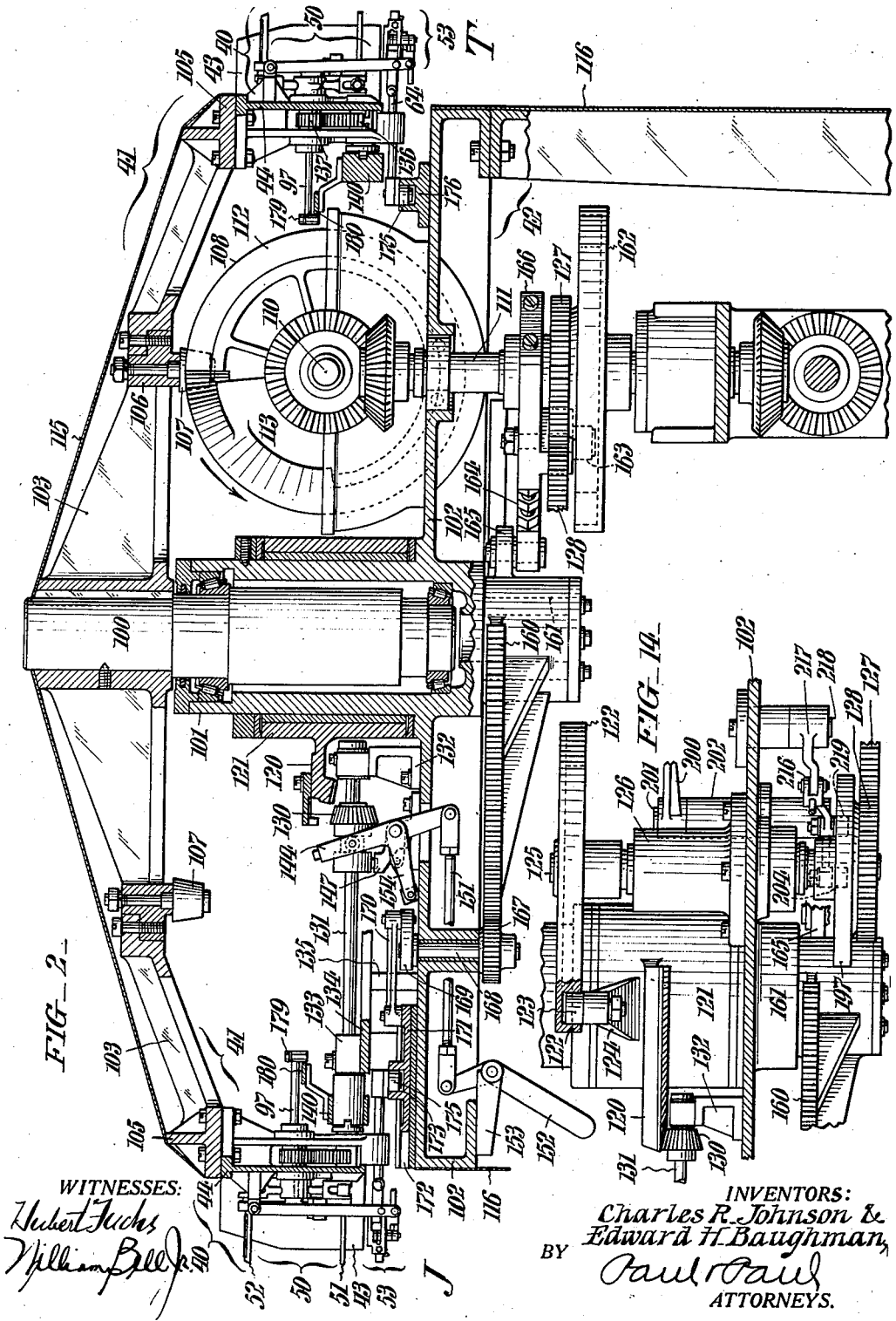

April 14, 1942.   C. R. JOHNSON ET AL   2,279,323
MANUFACTURE AND PACKETING OF DETONATORS
Filed May 17, 1940   11 Sheets-Sheet 3
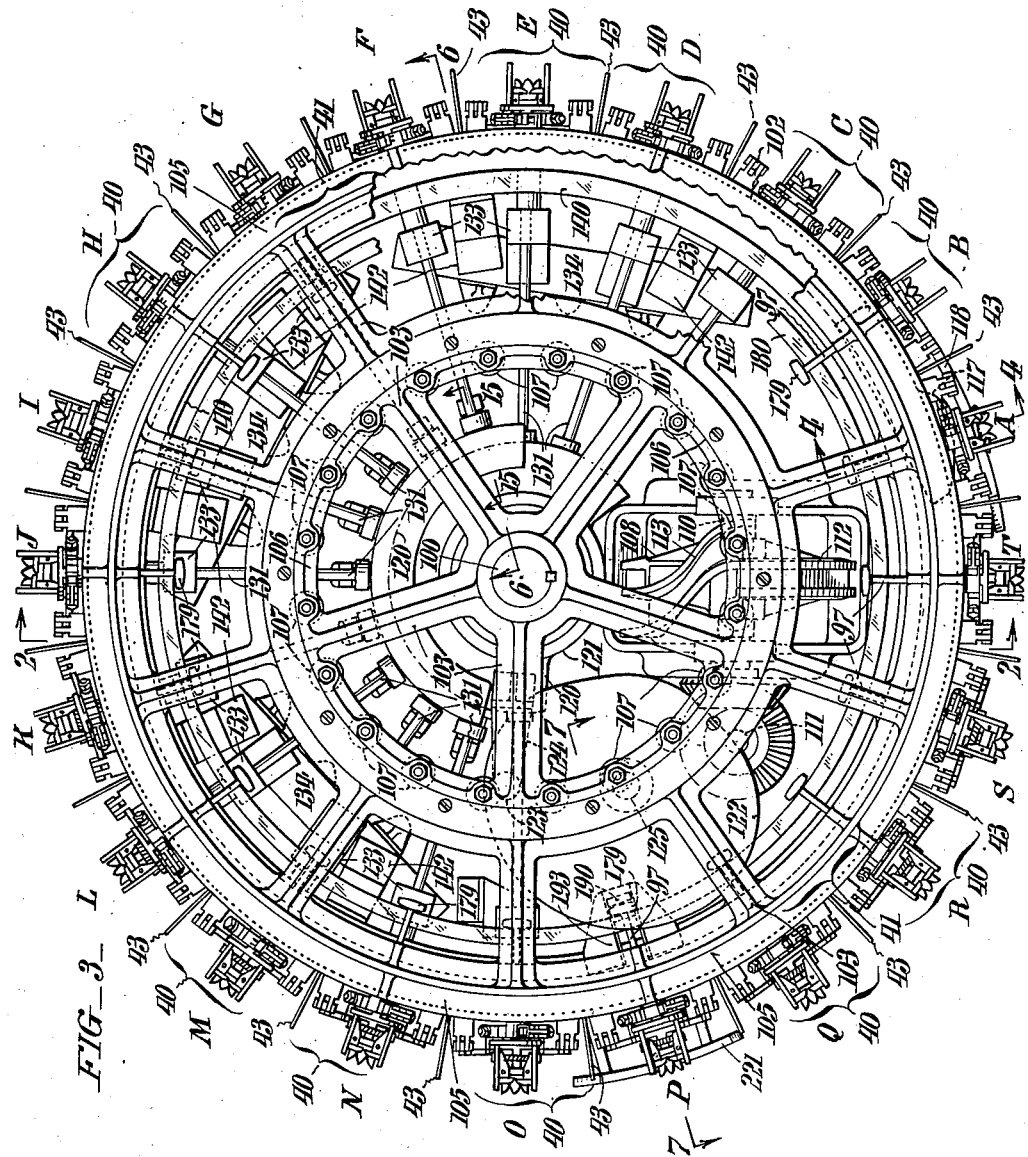
WITNESSES:
INVENTORS:
Charles R. Johnson &
Edward H. Baughman
BY
ATTORNEYS.

April 14, 1942.  C. R. JOHNSON ET AL  2,279,323
MANUFACTURE AND PACKETING OF DETONATORS
Filed May 17, 1940   11 Sheets-Sheet 4
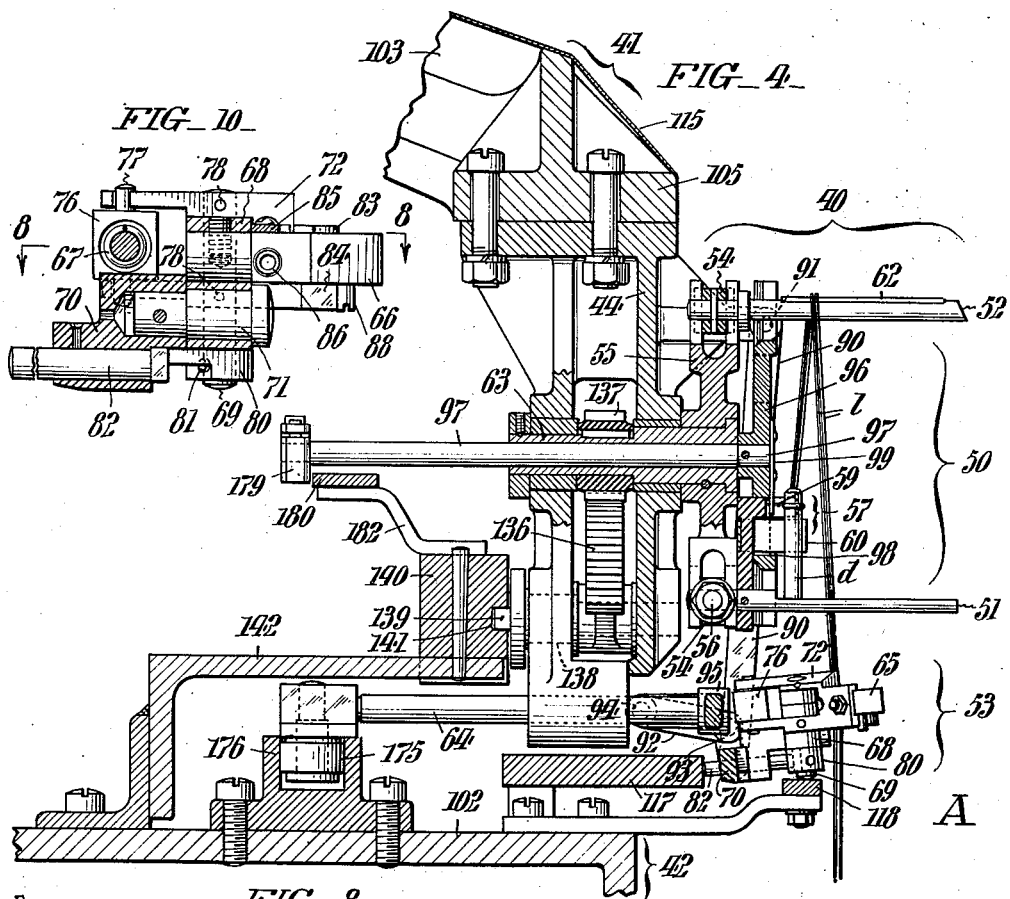
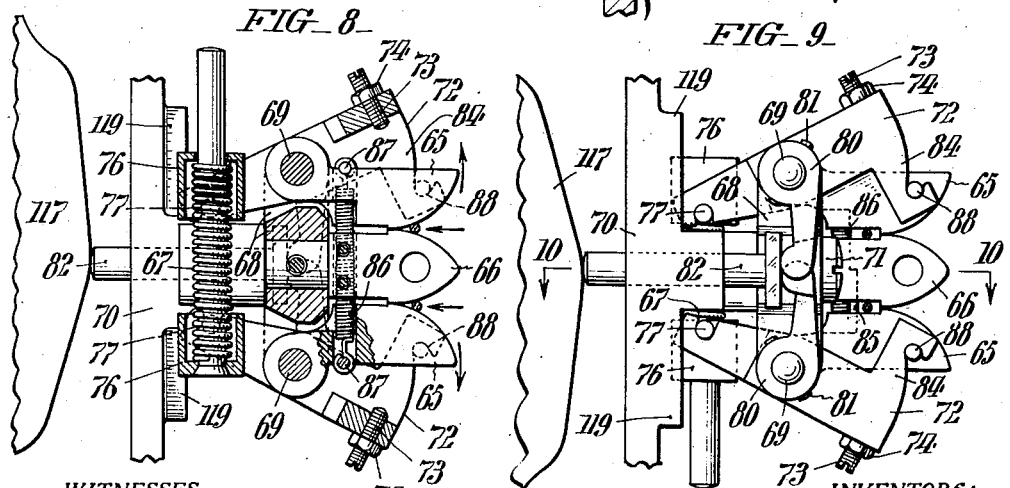
WITNESSES:
Hubert Fuchs
William Bell, Jr.
INVENTORS:
Charles R. Johnson &
Edward H. Baughman,
BY Paul & Paul
ATTORNEYS.

April 14, 1942. C. R. JOHNSON ET AL 2,279,323
MANUFACTURE AND PACKETING OF DETONATORS
Filed May 17, 1940 11 Sheets-Sheet 5
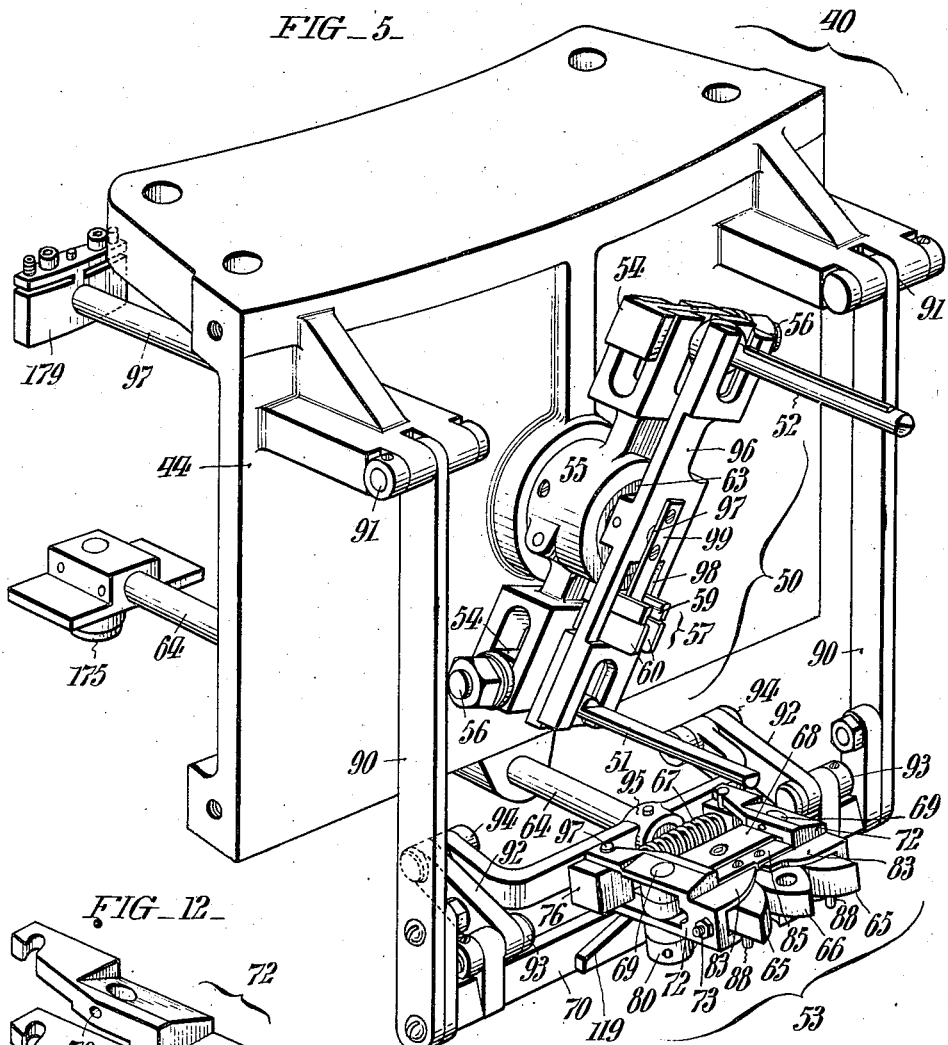
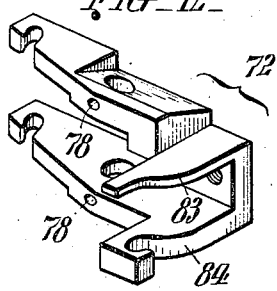
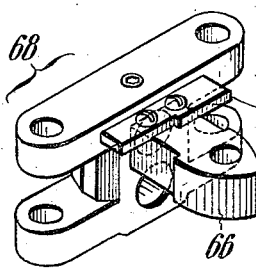
WITNESSES:
Hubert Fuchs
William Bell, Jr.
INVENTORS:
Charles R. Johnson &
Edward H. Baughman,
BY
Paul & Paul
ATTORNEYS.

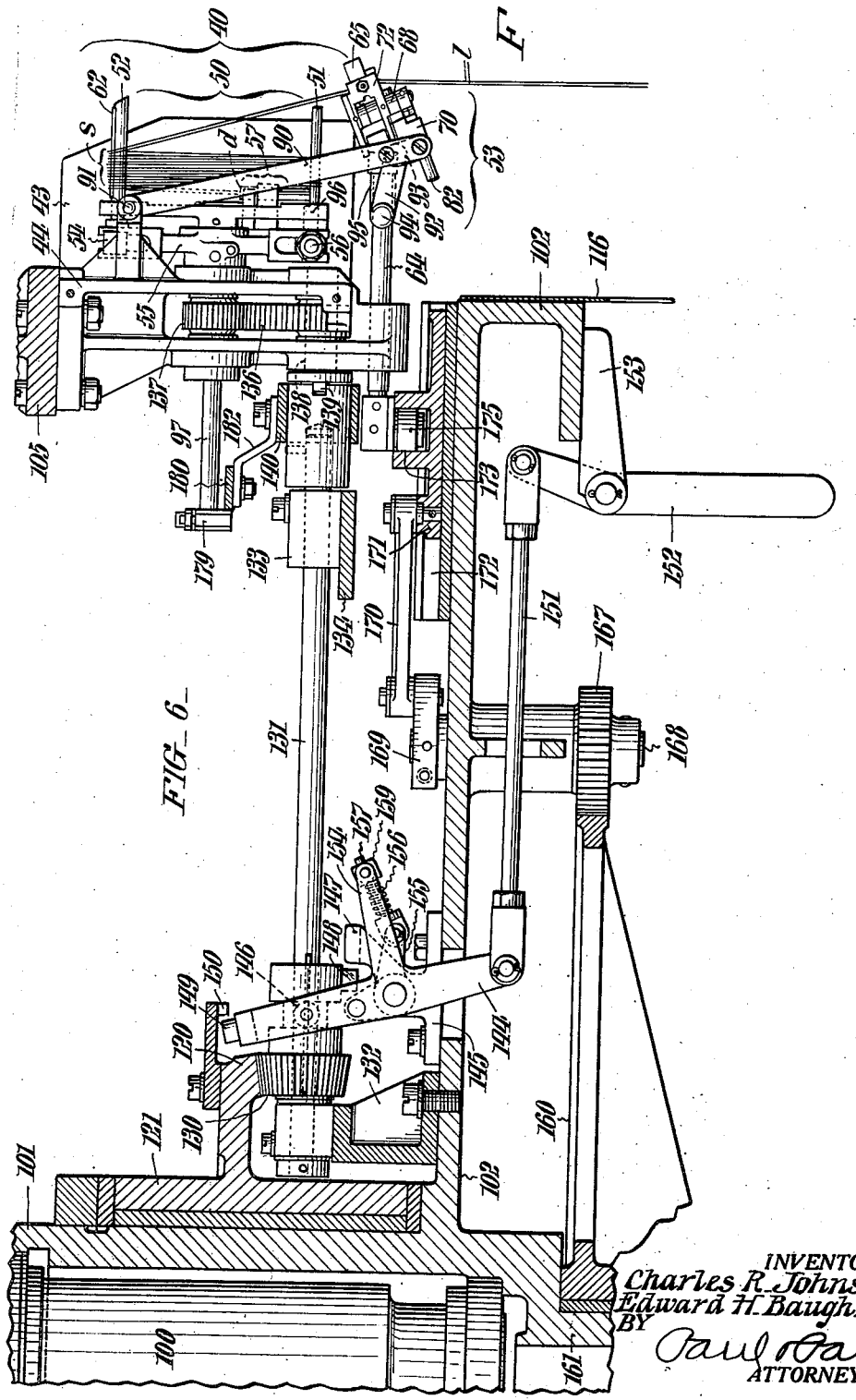

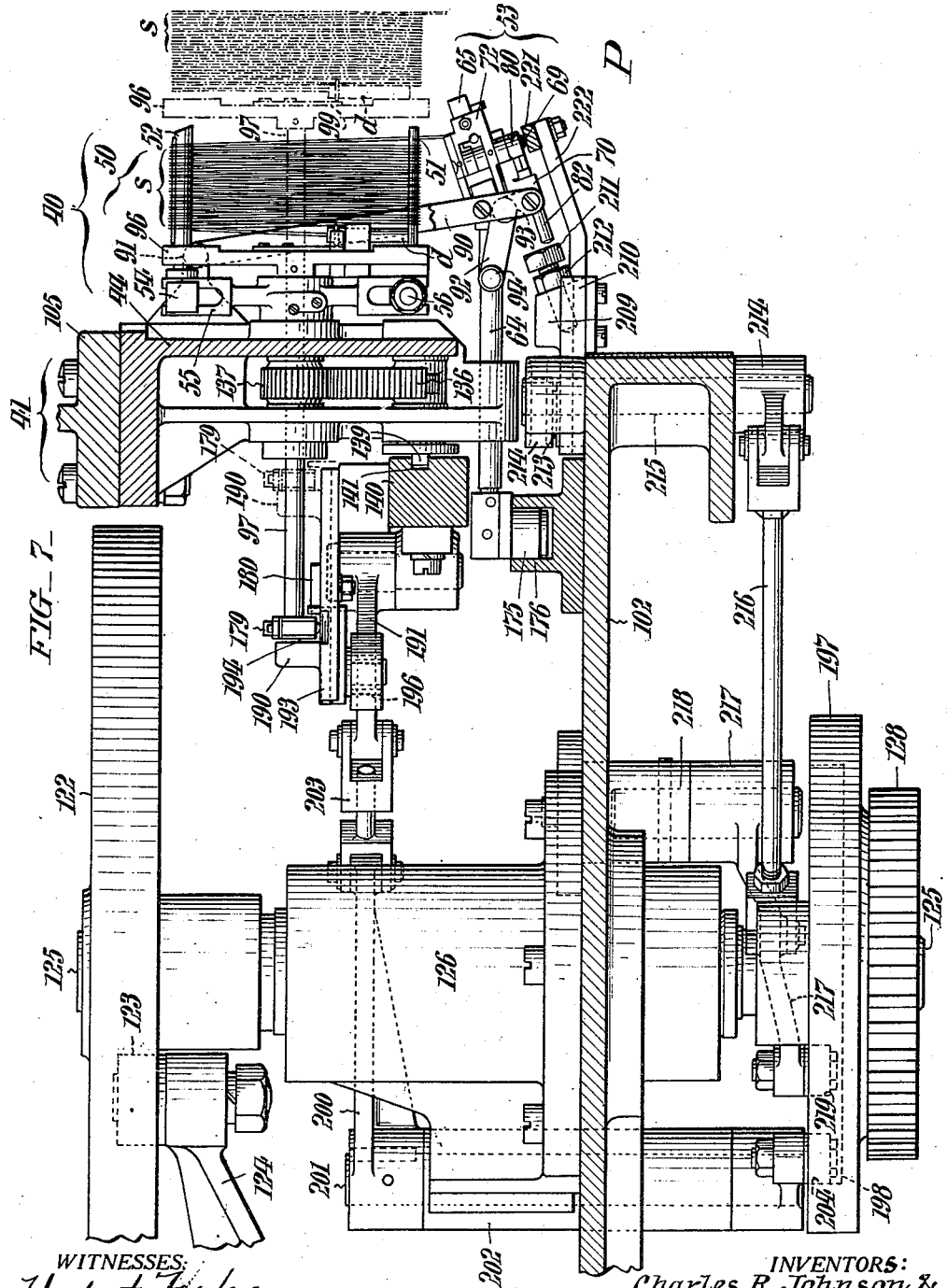

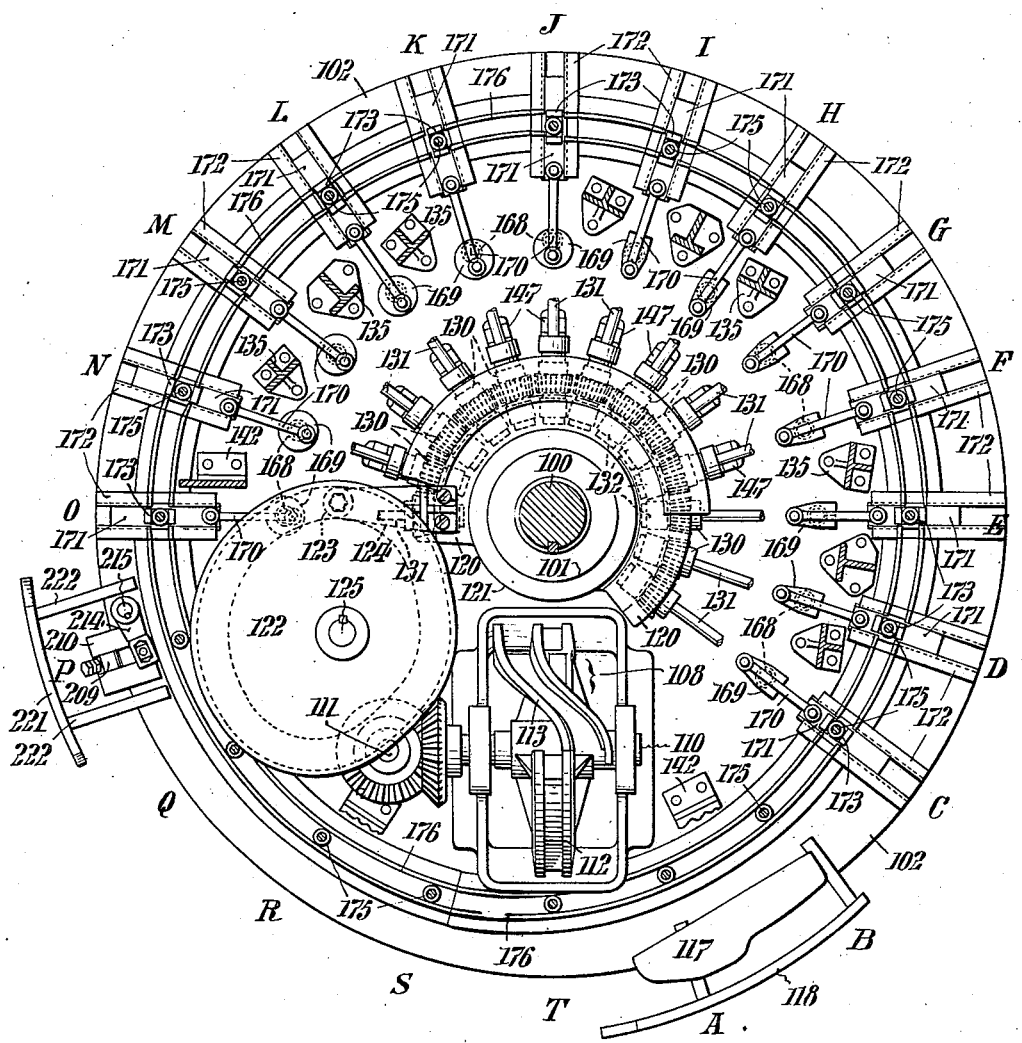

April 14, 1942.  C. R. JOHNSON ET AL  2,279,323
MANUFACTURE AND PACKETING OF DETONATORS
Filed May 17, 1940  11 Sheets-Sheet 9
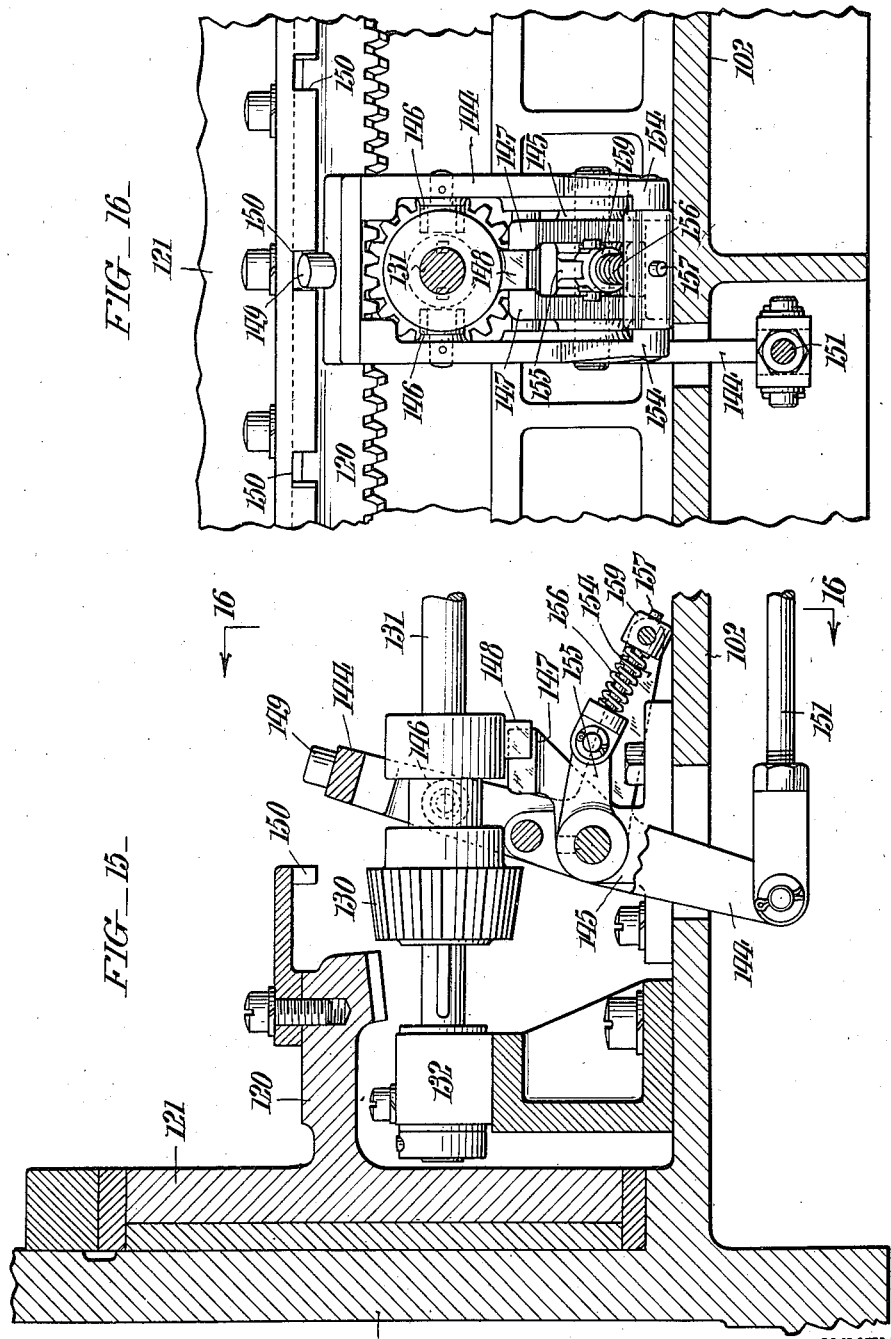
WITNESSES:
Hubert Fuchs
William Bell, Jr.
INVENTORS:
Charles R. Johnson &
Edward H. Baughman,
BY
ATTORNEYS.

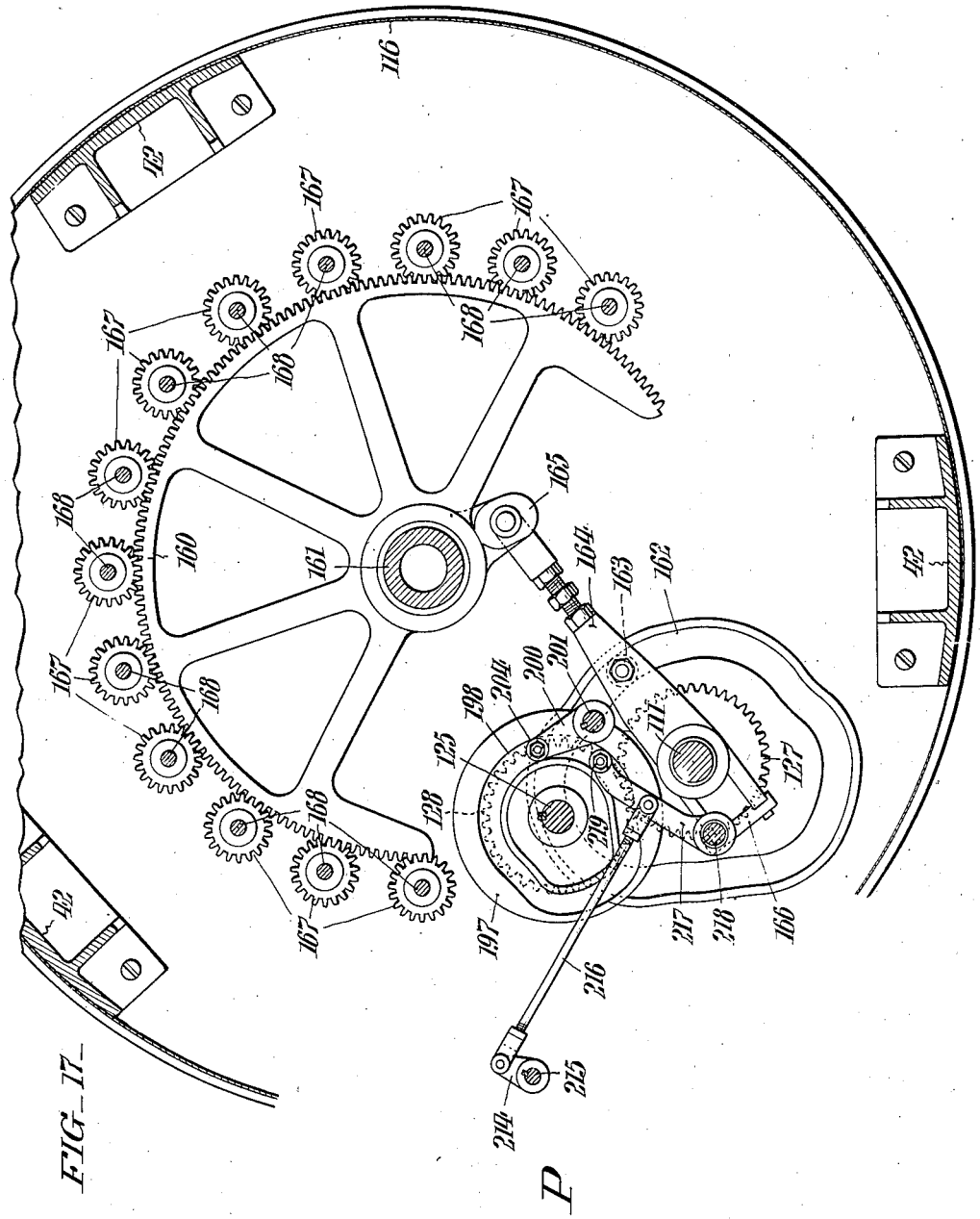

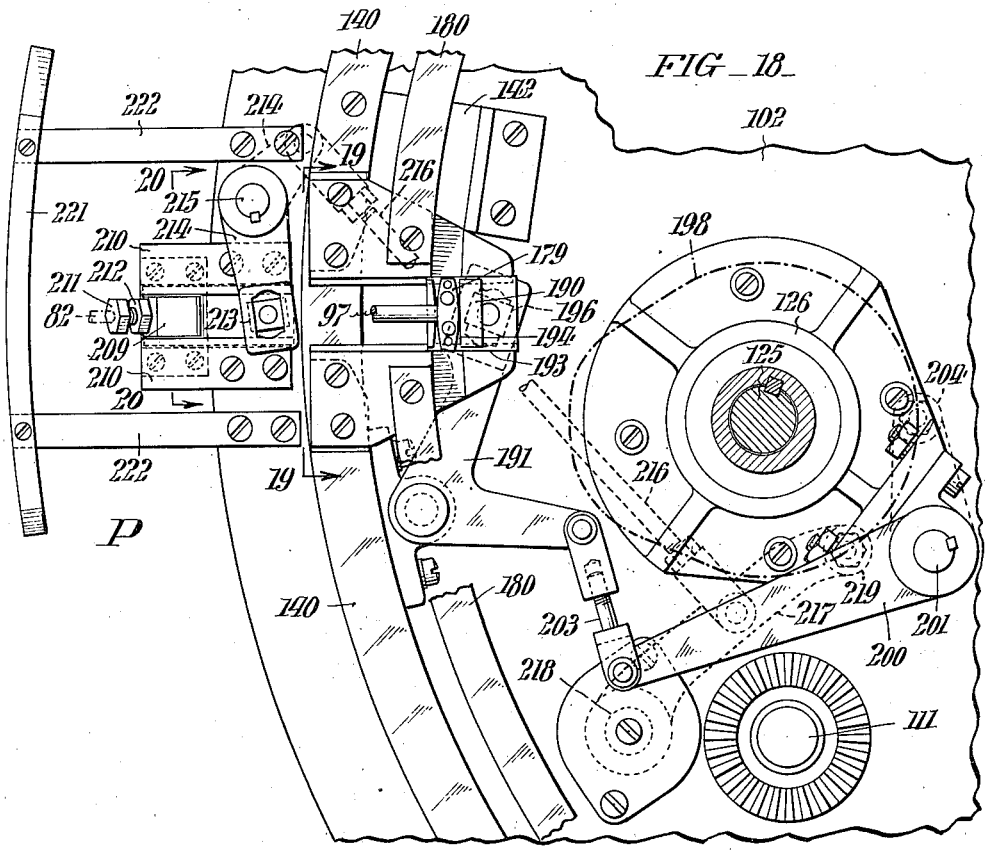
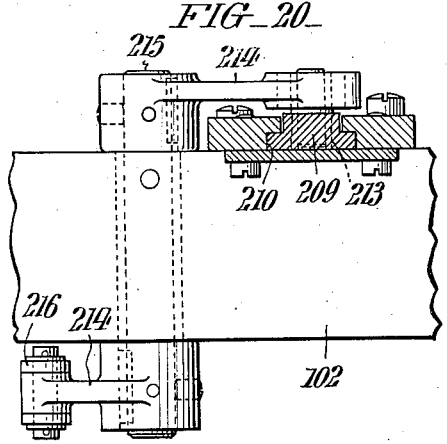
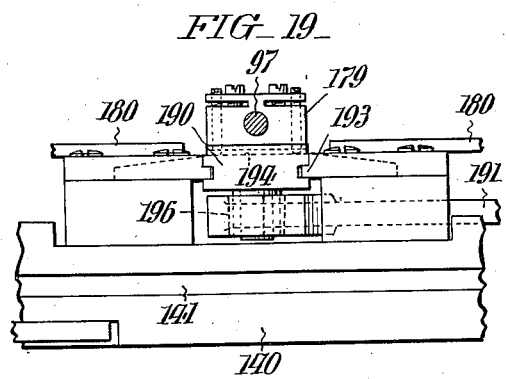

Patented Apr. 14, 1942

2,279,323

UNITED STATES PATENT OFFICE 2,279,323

MANUFACTURE AND PACKETING OF DETONATORS

Charles R. Johnson, Glen Mills, Pa., and Edward H. Baughman, Wilmington, Del., assignors to E. I. du Pont de Nemours & Company, Wilmington, Del., a corporation of Delaware Application May 17, 1940, Serial No. 335,740

46 Claims. (Cl. 242—53)

This invention relates to the manufacture and packeting of detonators or blasting caps, which includes the winding of the detonator leads into suitable coils or skeins, and various operations on the leads. In some of its features, the invention may be adapted and extended to the manufacture and packeting of other devices, or to the coiling of wires or the like for various purposes—though we have hereinafter explained it with particular reference to detonators or electric blasting caps.

The usual detonator or blasting cap consists of a charge of very powerful and sensitive explosive, such as mercury fulminate, packed in a metal shell or "cap" around a fine "bridgewire," which is connected between long insulated lead wires, some four to twelve feet long, more or less. It is very important that the electric circuit resistance of a detonator through its leads and bridgewire should meet carefully determined and exacting specifications, so that detonators shall fire reliably on their rated firing current; for a detonator that does not fire cannot safely be replaced with another detonator; and yet the unfired charge of dynamite in the rock or structure to be blasted is far too dangerous to be left undealt with. Because of the limited energy available for firing detonators from batteries of dry cells (in places often remote from power lines), their bridgewires have to be very fine and delicate, so that the charging and packing of fulminate or the like around the bridgewires is a delicate operation—to say nothing of the sensitiveness of the fulminate, and the danger of accidentally setting it off during all stages of the charging, completion, and packeting of the detonators. In practice, it has been found advisable to attach the bridgewires directly to the very same long insulated copper wires that are used as leads, since detonator leads with mechanically formed joints in them would give a circuit of uncertain integrity and electrical resistance; while the making of autogenous or welded lead joints after the detonators had been charged with explosive would be likely to give rise to explosions.

The possibility of accidental explosion of detonators is a very serious hazard; for while the quantity of explosive in a detonator is small, yet to fire dynamite reliably it has to be so powerful that explosion of a single detonator may blow a person's hand off, and simultaneous explosion of a bunch of detonators may inflict a fatal injury.

The considerable length of the detonator leads makes it necessary to wind them up into some compact form, to make a package suitable for shipment, etc. This is usually an elongated coil or skein, and preferably of the "figure 8" type; because this form of coil is easily unwound or straightened, by a simple pull, without kinking the wires. For various reasons, it has been found inadvisable to wind or coil the leads before attaching the bridgewire to them and associating the parts with the charge of explosive; and so the leads are generally coiled or wound when already attached to the charged detonator, and certain other operations are also performed on them when attached to the detonator: such as cutting them to exact length, and stripping insulation from their ends; testing the electrical resistance of the detonator circuit, by connections temporarily made to the stripped lead ends; protectively sheathing and/or interconnecting the stripped lead ends, as a precaution against accidental firing of the detonator; and "banding" the coiled detonator around its middle with a securing band or the like. Performed by hand, these operations are necessarily slow and expensive, and are attended with serious risk of injury to workers from accidental explosions.

An important object of this invention is to facilitate, expedite, and cheapen the manufacture of such devices, and especially the winding and packeting operations. In the case of detonators or other explosive devices, we also aim to obviate or minimize the risk of accidental explosions, and of injuries to workers. The invention involves novelty in method, as well as novel machinery and mechanisms for various operations. It will be understood, of course, that various operations or mechanisms hereinafter described may be used either separately or in conjunction with operations or mechanisms different from those here shown associated with them.

In a preferred mode of carrying out our invention, as hereinafter described, we at first wind up the detonator leads only partially into a skein, leaving the lead ends on which work remains to be performed extended beyond the skein. This is done on a winding form having spaced-apart members which may extend horizontal through the bends of the skein as it is wound, while the detonator cap attached to the leads is preferably held by a holder on the form. The winding operation can be carried out automatically in such a way that the pull or tension on the leads in winding is taken by the supporting members of the form, without any danger of pulling the leads out of the charged detonator. All pulls exerted on the lead wire ends during the subsequent work done on them may likewise be taken and sustained by supporting members engaged in the bends of the skein convolutions,—after the detonator cap has been released from the holder of the winding form, and left free,—so that no pull can be imposed on the detonator cap by pulls exerted on the lead ends during such work. After the desired work has been done on the extended lead ends, they are bent or wound up to the skein, which is thereby completed.

In the machine here illustrated and described, winding or coiling devices are provided for winding up the leads of a number of detonators more or less concurrently, or in overlapping sequence—in other words, in relations of partial concurrence. This allows of turning out the coils or skeins at a desirably rapid rate while doing all the work on them comparatively slowly, which is very desirable in order to obviate or minimize risks of accidental explosions. The coiling devices may be arranged to travel past a point of "loading" where detonators with leads to be wound are applied to them, and past a point of ejection where the wound coils or skeins are removed from the coiling devices. In the particular machine here illustrated and described, the movable carrier for the winding devices is in the nature of a revolving turret.

Various other features and advantages of the invention will appear from the following description of a species or form of embodiment, and from the drawings. All the features and combinations shown or described are of our invention, so far as they are novel.

In the drawings, Fig. 1 is a perspective or tilted view of a coiling machine or unit suitable for the purposes of the invention; Fig. 2 shows a vertical section through the machine taken as indicated by the line and arrows 2—2 in Fig. 3, certain parts being omitted; and Fig. 3 is a plan view of this machine or unit with the top cover shown in Figs. 1 and 2 removed.

Fig. 4 is a fragmentary sectional view taken as indicated by the line and arrows 4—4 in Fig. 3, illustrating parts at their positions when detonators whose leads are to be wound up are inserted in the machine; Fig. 5 is a perspective view of the principal parts illustrated in Fig. 4; Fig. 6 is a fragmentary view taken as indicated by the line and arrows 6—6 in Fig. 3, showing some parts in vertical section and illustrating a more advanced stage in the winding than that shown in Fig. 5; and Fig. 7 is a partly sectional view taken as indicated by the line and arrows 7—7 in Fig. 3, showing a completely wound skein ready to be ejected from the winding machine or unit.

Fig. 8 is a plan view of guide and holding means for controlling the winding of the detonator leads, with certain parts in horizontal section substantially as indicated by the line and arrows 8—8 in Fig. 10; Fig. 9 is a corresponding bottom plan view; Fig. 10 is a vertical sectional view, taken substantially as indicated by the line and arrows 10—10 in Fig. 9; and Figs. 11 and 12 are tilted or perspective views of certain parts shown in Figs. 8–10.

Fig. 13 is a plan view of the main frame and table of the machine and various associated parts, with the revolving turret or carrier removed, illustrating the actuation of certain parts; Fig. 14 is a fragmentary side view of certain driving mechanisms, with the "table" in horizontal section; Fig. 15 is a fragmentary partly sectional view taken as indicated by the line and arrows 15—15 in Fig. 3, illustrating an arrangement for throwing a coiling device of the machine out of action; and Fig. 16 is a view at right angles to Fig. 15, partly sectional, taken as indicated by the line and arrows 16—16 in Fig. 15.

Fig. 17 is a plan view of parts and mechanism below the table, some in horizontal section, illustrating certain driving mechanism, and especially that for the ejector of the machine; Fig. 18 is a fragmentary plan view of the table and associated parts, including arrangements for operating the ejector; and Figs. 19 and 20 are fragmentary views taken as indicated by the lines and arrows 19—19 and 20—20 in Fig. 18, with certain parts in vertical section.

For winding up the lead wires $l$, $l$ of blasting caps or detonators $d$, the winding machine or unit here illustrated comprises a number of coiling devices 40 carried by an upright (hollow) turret-like supporting structure 41 which is mounted on a framework 42, Figs. 1, 2, and 3. The coiling or winding devices 40 are spaced at uniform and fairly close intervals around the circumference of the turret 41, but are preferably separated by metal septa or shields 43 projecting from the structure 41, to prevent accidental explosion of one detonator $d$ from setting off any of the neighboring detonators. As indicated in Figs. 1, 2, and 5, each of the devices 40 may be carried by a detachable flanged portion or section 44 of the structure 41, removable therefrom as a unit—as more fully explained hereinafter. The particular machine here illustrated has twenty of the coiling devices 40; but a greater or less number of such devices might of course be provided. Presented at the outer side of the wall of the turret 41, coiling devices 40 are advantageously operated by mechanism inside or behind the wall, or in the subjacent frame work 42, as explained hereinafter.

Adjacent the winding machine is shown a sloping trough or tray 45 containing a supply of the detonators $d$, with their (straight) lead wires $l$, $l$ lying side by side. In Fig. 1, three of the detonators $d$ are shown attached to the winding devices 40, with their leads $l$, $l$ partly wound on said devices 40, and hence partly drawn out of the trough 45. Provisions may be made for moving the structure 41 to bring its coiling devices 40 successively to convenient positions for the introduction or application of detonators from the supply at 45 to said coiling devices, and for the removal of the wound coils or skeins.

As shown in Figs. 1, 2, 4, and 5, each of the winding devices 40 comprises a winding head or form 50, with spaced-apart wire-engaging and bending members or pins 51, 52, and coacting wire-guiding and holding means 53. Both the form 50 and the guide 53 are presented at the outer side of the corresponding portion 44 of the turret wall. As shown in Figs. 4 and 5, the members or pins 51, 52 are adjustable toward and from one another to vary the length of the coil or skein wound on them, being mounted in blocks 54 which slide in the forked ends of the form member 55, and can be secured in any desired positions by clamping bolts 56. The form also includes a holder 57 for the detonator cap $d$ belonging to the leads $l$, $l$ that are to be wound on the form, arranged between the winding pins 51, 52. The detonator holder 57 is shown as comprising fingers projecting from the form member 55 to receive the detonator cap $d$ snugly between them, and grooved at 59, 59 to receive an annular ridge (Fig. 4) on the cap $d$ and thus hold the latter in perfectly definite position, with its end against the flat inner side of the pin 51, Figs. 4 and 5. The cap-holding fingers (or portions 60, 60 thereof) are preferably made resilient, and spaced to hold the cap $d$ lightly but firmly between them, with a yielding spring pressure. One of the pins 51, 52 (the pin 52 as shown) may have an elastic friction surface at its outer side—shown as a ridge 62 formed by a strip of elastic vulcanized rubber inset in the pin—to assist in holding the convolutions of leads $l, l$ having a polished of slick insulative covering—such as ethyl cellulose, which has a very low coefficient of friction.

The figure-8 winding of the leads $l, l$ is effected most advantageously by oscillation of the form 50 through an angle of substantially 180° about a (hollow) axis or shaft 63 (which is attached to the form 50 between its pins 51, 52, and is mounted in a rotational bearing on the turret section 44), so as to interchange the general positions of the pins, and by correlative to and fro movements or reciprocation of the guide 53 in substantially the general direction of the axis 63, inward and outward toward and from the form. Such inward and outward movements may be periodically imparted to the guide 53 by an operator rod 64 that extends through a slide-bearing on the turret wall portion 44 to the inner side of the wall. By timing these movements so that the half-reciprocations of the guide 53 alternate with the half-oscillations of the form 50 and its pins 51, 52, the pair of leads $l, l$ are bent around the pins and laid between them in a figure-8, as will readily be seen from study and comparison of Figs. 1, 4, 5, and 6; and thus skeins of figure-8 convolutions of the wires $l, l$ are wound on the form 50. For reasons which will appear hereinafter, the winding pins 51, 52 and the axis of oscillation 63 preferably extend substantially horizontally, crosswise of the path of movement of the winding devices 40 with the carrier turret 41, and radially of the latter; and the normal positions (of rest or hesitation) of the form 50 between its half-oscillations is substantially sloping, as shown in Figs. 1 and 5, rather than vertical. The line of to and fro motion of the guide 53 and the rod 64 is preferably below the form 50, in a vertical plane that normally lies in the interval between the pins 51, 52, and substantially corresponds with the axis of oscillation 63 and the rod 64. In general, the slope of the winding forms 50 when stationary should be substantial, and not less than about 15°, in order to assure proper laying of the wires $l, l$ between the winding pins 51, 52 during the inward movement of the guides 53; and it may be as much as 45° or even more. Experience has shown that an angle of about 28° is particularly advantageous.

As best shown in Figs. 1, 4, 5, 6, and 8, and as already briefly explained, the guide 53 holds the leads $l, l$ in proper position relative to the winding members or pins 51, 52 of the form 50 at all times, and also shifts the leads $l, l$ outward beyond the ends of the lower winding pin to let the latter pass behind the leads during the alternating rotary movement. In the machine here illustrated, this guide 53 also serves to impose and maintain a suitable winding tension on the leads $l, l$ to insure their being tautly and uniformly wound and coiled, by exerting a frictional resistance to the passage of the leads as they are drawn through the guide by the motions of the pins 51, 52. Experience has shown that a tension of about 3 pounds on each wire $l, l$ usually gives good results. For this purpose, the guide 53 may be constructed with clamp and friction jaws 65, 66, 65, arranged and mounted side-by-side to hold and grip the two leads $l, l$ of the detonator $d$ separately and yieldingly, with an elastic pressure exerted by a helical spring 67, Figs. 1, 4, 5, 9, 10, 11. By elastically gripping the wires $l, l$ separately, proper tension on both of them is assured during winding, regardless of inequalities in the sizes of the wires—either relative to one another, or individually. As shown in Figs. 5, 9, 10, and 11, the jaw 66 lies between the two leads $l, l$ and forms part of a T-shaped guide body 68 of the device 53, best shown in Fig. 11, while the jaws 65, 65 press the leads against the opposite sides of the jaw 66 and are pivoted to said body 68 by short shafts 69, 69. The openings of the jaws 65, 66, 65 are sown as presented outward, away from the form 50 and the turret 41, for sidewise insertion and withdrawal of the wires $l, l$. For reasons that are explained hereinafter, the guide body 68 is preferably pivoted to the part 70 (through which the rod 64 actuates it) about an axis 71 between the clamps for the two wires $l, l$ that extends in the general direction of the form axis 63, so that the whole guide 53 can turn or rock in a corresponding (nearly) vertical plane relative to said part 70, as best shown in Fig. 10.

As shown in Figs. 5, 8, and 10, the spring 67 does not act directly on either jaw 65, but on an associated channeled and forked part 72 (best shown in Fig. 12) which is pivoted at 69 (about at mid-length) to the body 68, coaxially with the corresponding jaw 65, and carries an adjustable abutment-screw 73 in its outer end (with locknut 74) for engaging the back of said jaw 65, Fig. 5. As shown in Figs. 5, 8, 9, and 10, the spring 67 acts in compression between socketed followers 76, 76 pivoted at 77, 77 to the forked inner ends of the parts 72, 72.

As shown in Figs. 5, 9, and 10, the parts 72, 72 are keyed fast to the pivot shafts 69, 69 (at 78, 78) to turn with them, and actuating rock-arms 80, 80 are keyed fast (at 81, 81) to the lower ends of each of the shafts 69, 69. The rounded outer ends of the rocker arms 80, 80 lie in the path of a plunger 82 that slides lengthwise in a bearing in the part 70 below the pivot 71. As shown in Figs. 1, 5, and 12, each of the parts 72, 72 has guard projections 83, 84 which overlap the outer ends of the jaws and retain the leads $l, l$ in proper positions while the leads are being coiled, but which are retracted out of the way (by the action of the plunger 82 on the rockarms 80) as shown in Figs. 8 and 9 when the leads are to be initially inserted between the jaws—i. e., when the detonator $d$ is detachably mounted on the winding form 50, in its holder 57. The outer ends of the jaws 65, 66, 65 may be reduced and rounded to facilitate this sidewise insertion of the leads $l, l$. As shown in Figs. 5, 10, and 11, the positions of the leads $l, l$ in the clamps 65, 66, 65 when inserted are determined by the edges of a stop piece 85 secured to the guide body 68, against which the leads are held by the guards 83, 84 associated with the clamp jaws. The edges of this piece 85 against which the leads $l, l$ lie are shown offset in the general direction of the form axis 63 relative to one another, Figs. 5, 9, and 11, and the edges of the guards which coact with this part 85 are shown similarly offset, Fig. 5, so that the leads $l, l$ are held at different positions lengthwise of the pins 51, 52 and of the axis 63, Fig. 4, and are caused to wind side-by-side on the pins, in the same relative positions in all their convolutions. When the parts 72, 72 are retracted, the spring 67 is of course ineffective; but the jaws 65, 65 may then nevertheless be yieldingly held together on the leads l, l and against the jaw 66 by suitable means, such as a helical tension spring 86 extending through holes in all the jaws and connected to pins 87, 87 bearing against the outer sides of the jaws 65, 65. This condition is illustrated in Fig. 9, which shows positions of the leads l, l just after their insertion in the clamps 65, 66, 65, before they have been pressed back against the stop 85 by closure of the guards 83, 84, Fig. 5. As shown in Figs. 8 and 9, the jaws 65, 65 have pins 88, 88 in their outer ends, and the projections 84, 84 of the parts 72, 72 have hook-lugs on their outer ends to engage these pins and open the jaws 65, 65, for withdrawal of the leads l, l sidewise from the guide 53.

The operation of the plunger 82 and the actuation of the parts 72, 72 thereby are explained hereinafter.

The guide 53 has hitherto been referred to as if it were moved to and fro in a strictly radial direction by the operating rod 64. Such a movement would, of course, vary the length of lead wires l, l extending from the winding pin 52 (or 51) then uppermost to the tension clamps of the guide 53: i. e., at the outer extreme of movement in Fig. 6, the length of the wire drawn through the clamps and extending between them and the upper pin would be greater than at the inner position of the guide shown in Fig. 4; so that when the guide next returned inward, the wire would hang slack between the upper pin and the clamps. As a result of this, the leads l, l would not be wound up regularly and uniformly, so as to produce uniform and well-formed skeins or hanks; furthermore, the slack lead wires might often fall on the wrong side of the lower pin 51 (or 52) when the guide 53 moved inward.

To obviate this, we provide for taking up the slack that would thus be developed—or, more properly, for avoiding slack altogether. This we accomplish by modifying the motion of the guide 53 produced by the radial in-and-out motion of the operator rod 64 so that the distance from its tension clamps to the bend of the wire around the uppermost pin 52 (or 51), to which the wire extends, does not vary objectionably, but remains essentially constant during the inward movement of the guide toward the winding form. For this purpose, as shown in Figs. 1, 4, 5, and 6, the crosshead-like part 70 (to which the guide body 68 is pivoted at 71) may be mounted to swing in a substantially radial plane about an axis substantially at the level of or in line with the uppermost pin 52 (or 51) when this pin is at the extreme of its movement which is further from the guide, as by mounting said part 70 on supporting link-rods 90 pivoted at 91 to lugs on the turret section 44. With link-rods 90 proportioned as shown, the distance from the upper winding pin 51 (or 52) increases somewhat during the inward movement of the tension clamp or guide 53. As shown in Fig. 5, the connection of the operating rod 64 to the part 70 that permits sidewise movement of the guide 53 relative to the rod 64, as required by the swinging movement of the part 70 and the guide, comprises short links 92 pivoted at 93 to the part 70 and at 94 to a yoke-like part 95 fixed on the outer end of the rod 64.

For removing or ejecting the wound skeins or coils s from the form 50, the winding device 40 is shown (Figs. 4, 5, 6, and 7) as provided with an ejector in the form of a bar 96 that normally lies close in front of the form member 55, but is movable along the winding pins 51, 52 in the general direction of the axis 63, and is preferably operated by an attached rod 97 extending (and movable lengthwise) through the wall portion 44 to its inner side, in the bore of said winding-form axis 63—as indicated in Fig. 4. As best shown in Fig. 5, the ends of the ejector bar 96 are apertured or forked to accommodate the pins 51, 52, and it is also apertured at 98 to accommodate the cap-holder 57. To assure release or ejection of the detonator cap d from the holder 57 when the skein s is ejected, the ejector bar 96 has a tongue 99 (preferably somewhat resilient or springy) that lies between the cap-holding finger 60, 60 and acts to push the cap d out from between them when the wound coil or skein s of lead wires l, l is ejected from the form. The periodic actuation of the ejector operator rod 97 from inside the turret 41 will be described hereinafter.

As shown in Figs. 2, 3, and 6, the turret structure 41 is mounted for horizontal rotation, about an upright axis, being fixed on the upper end of an upright shaft 100 revoluble in bearings in a hub 101 at the center of a horizontal table-like web 102 forming part of the frame 42. The carrier or turret 41 is shown as comprising a wheel-like spider 103 whose radial spokes carry a rim 105 to which is attached a depending wall or skirt made up of the flanged sections 44, Figs. 1, 4, 5, and 6, detachably bolted to the rim 105 and each carrying one of the winding devices 40. The spider 103 has an intermediate annular brace 106 interconnecting its spokes, which slope outward.

As one suitable means for rotating the turret or carrier 41, there is shown in Figs. 2 and 3 a "worm and gear" type of drive, comprising a series of rollers 107 mounted at regular intervals on the annular spider brace 106 and coacting (as "gear teeth") with a wheel 108 (as the "worm") mounted on a horizontal shaft 110 driven by bevel gearing from an upright shaft 111 that is mounted in suitable bearings on the frame 42, and may be driven at uniform speed from any suitable source of power. As will be seen from Fig. 3, the rollers 107 engage at either side of the rim or periphery of the wheel 108. The character of the motion thus imparted to the carrier 41 depends on the conformation of the periphery or rim of the wheel 108. As shown in Figs. 2, 3, and 13, the wheel 108 comprises a straight peripheral portion 112 lying in a plane perpendicular to the shaft 110 and extending about 270° around the shaft, and a (curved) portion 113 lying generally at an inclination to said plane and shaft, and extending substantially 90° around the shaft. This portion 113 is shown as peripherally grooved to receive between its flanges the rollers 107 on the spider 103. Accordingly, the carrier 41 has an intermittent step-by-step rotation as the shaft 111 revolves uniformly. During its periods of rest the carrier 41 is definitely locked and fixed by the engagement of its rollers 107 with the straight portion 112 of the rim of the wheel 108, notwithstanding the continued rotation of the wheel. By suitable design of the wheel 108, the steps of movement or "indexing"

of the carrier 41 may be made to correspond with the intervals between successive coiling devices 40 around the carrier.

A removable protective conical sheet metal cover 115 covers the spider 103 (and the parts beneath it) in Figs. 1 and 2, but is removed in Fig. 3 to reveal parts underneath the spider. The parts beneath the turret 41 and the table 102 may also be enclosed and protected by a removable sheet metal casing 116 around the frame 42.

In the operation of the winding machine or unit, detonator caps $d$ from the supply at 45 are successively placed in the holders 57 of the winding forms 50 as the coiling devices 40 successively traverse and pause at the position or station marked A in Figs. 1, 3, 4, and 13. An attendant can do this very easily, by simply picking up a detonator cap $d$ and drawing its leads $l, l$ to the right from the supply (Fig. 1) until there is a sufficient free length of the leads $l, l$, and then placing the cap $d$ in the holder 57 at station A and training the leads $l, l$ up behind the upper pin 52 and around the latter and down in front of it behind the lower pin 51 (i. e., between the pins and below them) into the clamps 65, 66, 65, in which he inserts the leads sidewise—all as shown in Figs. 1, 4, 8, 9, 10. To permit this, the clamp parts 72, 72 are automatically retracted as each winding device 40 approaches the station A, by the action of a stationary cam track 117 (attached to the table 102) on the plunger 82, Figs. 3, 4, 8, 9, and 13, thus releasing or relaxing the clamps and leaving the clamping jaws 65, 66, 65 free to open easily. As the coiling device 40 thus "loaded" at A moves to the right in Fig. 1, its plunger 82 leaves the cam 117, and the clamp parts 72, 72 are allowed to come together and impose the full gripping force of the spring 67 on the clamp jaws 65, 66, 65, while the portions 83, 83 and 84, 84 of said parts 72, 72 come in front of the leads $l, l$, as shown in Fig. 1 at station B, and in Fig. 5.

To facilitate the insertion of the leads $l, l$ in the clamps 65, 66, 65 at or beyond station A, each guide 53 may be automatically levelled and held level during this portion of its travel, as by a horizontal cam track or rail 118 extending from a point well in advance of station A to a point somewhat beyond station B, Figs. 1, 3, 4, 13, in position to engage the underside of the guide 53—or, more specifically, the rounded and projecting lower ends of the clamping jaw pivots 69, 69, as shown in Fig. 4. This cam-track 118 is shown as attached to the table 102 by bracket arms, and as having its leading ends bevelled or sloped downward to facilitate the engagement of the guide 53 therewith. The rocking of the guide 53 relative to the part 70 may be limited by shoulders 119, 119 on the part 70, arranged to engage the inner ends of the parts 72, 72, so as to prevent the guide from assuming positions that might make its proper engagement with the track 118 impossible. After each guide 53 leaves the far end of the cam track 118, beyond station B, the guide is free to swivel about the axis 71 under the pull of the leads $l, l$ due to the sidewise movements of the winding pins 51, 52 as the forms 50 oscillate during the coiling operation at each station C, D, E, etc. This obviates the formation of bends in the leads $l, l$ adjacent the clamps 65, 66, 65, as would occur if the clamps remained in fixed position relative to the pivot 71.

As the loaded coiling device 40 travels on to the right (or counter-clockwise) with the movement of the carrier 41, it operates to wind the leads $l, l$ on the form 50 in a figure-8 skein, by the action already described. In the machine here shown, the coiling devices 40 are all operated concurrently but intermittently, during the halts or pauses in the movement of the carrier 41, in such a way that one complete figure-8 convolution of each pair of leads $l, l$ is wound at each station C, D, E, etc. Accordingly, there occurs at each station C. D., E, etc. one double oscillation of each winding form 50 and one double reciprocation or out and in movement of each guide 53, in proper interrelation as hereinbefore described. The stations Q to T between the ejection station P and the loading station A are shown as idle stations, at which nothing is done.

Means for imparting oscillatory movement to the winding forms 50 are shown (especially in Figs. 2, 3, 4, 6, 7, 13, 14) as comprising a segmental bevel actuator gear 120 rotatably mounted for oscillation coaxially with the rotation of the carrier 41, on an external bearing 121 on the hub 101, and itself actuated by any suitable means, such as a constantly rotating cam 122 having a lateral groove in which is engaged a roller 123 on an arm 124 attached to said gear 120. As shown in Figs. 2, 13, and 14, the upright shaft 125 carrying the cam 122 is mounted in a bearing 126 on the table 102, and is driven from the shaft 111 through intermeshing gears 127, 128 on the shafts 111, 125. The segmental bevel gear 120 is arranged to mesh with bevel pinions 130 on radial oscillator shafts 131 mounted in bearing brackets 132 on the table 102 and in bearings 133 that are carried by "bridge-bars" 134 supported from the table 102 by brackets 135, Figs. 2, 3, 6. As shown in Figs. 2 and 6, the shafts 131 drive the winding-form shafts 63 through (segmental) gears 136 and coacting pinions 137 on said shafts 63. The operating connection from each winding form 50 to the inner side of the wall section 44 and the coacting oscillator 131 also comprises a short operator shaft 138 (on which the segmental gear 136 is fixed) mounted in rotational bearings on the wall section 44, and shown in Fig. 6 in axial alignment with an oscillator 131. The parts 136, 137, 138 revolve with the carrier 41, while the oscillator shafts 131 remain stationary with the table 102.

When the shafts 131 and 138 are in line, they are coupled together by radially extending or diametral ridges 139 on the ends of the shafts 138 which engage in corresponding grooves in the (enlarged) ends of the shafts 131. For the normal positions of rest of the winding forms shown in Figs. 1, 2, 6, the ridges 139 extend horizontally, in the plane of rotary movement of the shafts 138, so that each time the carrier 41 moves from station to station, Figs. 1 and 3, the ridge 139 of each shaft 138 can slide through and leave the groove of one shaft 131, and travel along into the groove of the next shaft 131. As shown in Figs. 2, 3, 4, a bar or rail 140 extends annularly around the machine above the table 102, even with the ends of the shafts 131 (which revolve in openings in this bar), and has a groove 141 that aligns with the diametral grooves in the shaft ends when these latter grooves are horizontal; so that during the movements of the carrier 41, the diametral ridges 139 of the shafts 138 travel in the groove 141, which thus locks the winding forms 50 against rotation except when the shafts 138 are in line with the shafts 131. As shown in Figs. 3 and 4, the annular rail 140 is carried by brackets 142 attached to the bridge-bars 134.

When the wires l, l to be wound are so short that they can be fully wound up before the final winding station N is reached, it may sometimes be desired to prevent operation of the coiling devices 40 at certain stations of the machine, or at least to prevent oscillation of the winding forms 50 at such stations. This may be done by interrupting the driving connection from gear 120 to shaft 138 through the oscillator shaft 131; and for this purpose, each pinion 130 is here shown (Figs. 2, 6, 15, 16) as splined on its shaft 131 to permit of shifting it axially out of mesh with gear 120, or vice-versa. The shifting means shown in Figs. 6, 15, 16 comprises a yoke-lever 144 that is fulcrumed on a bracket 145 attached to the table 102 and carries rollers 146, 146 engaging in a circumferential groove in the hub of the pinion 130.

As shown in Figs. 6, 15, 16, the bracket 145 has spaced lugs 147, 147 adapted to receive between them a lug 148 on the limb of pinion 130 when the latter is thrown out of mesh, and thus hold the pinion and the shaft 131 in definite positions, while the yoke-lever 144 has at its upper end a lug 149 adapted to pass through a notch 150 in a flange on the gear segment 120 when the latter is in proper position for meshing with the pinion 130. These arrangements insure that the pinion 130 shall always mesh properly with the gear 120, without clashing, and that the diametral groove in the end of shaft 131 shall always be aligned with the groove 141 in the rail 140 when required. For operating the shift lever 144, its lower end is connected by a link-rod 151 to a hand lever 152 fulcrumed on a bracket 153 on the table 102. As shown in Figs. 6, 15, 16, there is a spring-toggle arrangement for throwing the shift lever 144 to its extreme positions and holding it there, comprising arms 154, 154 on the shift lever 144, a fixed arm 155 on the bracket 145, and a compression spring 156 mounted on a guide rod 157 pivoted to the bracket arm 155 and acting between the enlarged end of this rod and a block 159 sliding on it and pivoted between the ends of the lever 154, 154.

Means for imparting in and out movement to the lead wire guides 53 are shown (especially in Figs. 2, 5, 6, 13, 17) as comprising a segmental actuator gear 160 rotatably mounted for oscillation coaxially with the rotation of the carrier 41, on a downward extension 161 of the hub 101 below the table 102, and itself actuated by any suitable means, such as a constantly rotating cam 162 fast on the upright shaft 111 below the gear 127 and having a lateral groove in which is engaged a roller 163 on a slide-rod 164 connected at one end to a crank-arm 165 on the hub of said gear 160. As shown, the other end 166 of the slide-rod 164 is forked and engages around the shaft 111, so that as the rod 164 moves lengthwise under the acting of the cam 162, it can also rock as required by the angular movement of the crank 165, Figs. 2 and 17. The segmental gear 160 meshes with pinions 167 on the lower ends of short upright shafts 168 mounted in bearings on the table 102, and having rotatable (oscillating) eccentric-crank actuators 169 fixed on their upper ends, above the table 102. Through connecting rods 170, the cranks 169 impart to and fro motion to reciprocator slides 171 in radial guideways 172 on the table 102, and these slides have transverse grooves 173 for rollers 175 pivoted to the inner ends of the operating connections or rods 64 of the lead-wire guides 53. During the pauses in the movement of the carrier 41, when the rollers 175 are engaged in the grooves 173 of the actuating reciprocators 171 as shown in Figs. 2, 6, 13, the latter reciprocate or move the winding guides 53 outward and inward, from and toward the winding forms 50. During the movement of the carrier 41, on the other hand, when the winding guides 53 are in their normal (inner) positions of rest shown in Figs. 2, 3, and 13, the grooves 173 of the slides 171 align with the groove of an annularly extending guideway or trackway 176 fixed on the table 102; and as the carrier 41 moves, the rollers 175 of the several guides 53 slide through and leave the grooves 173, and travel in the guideway 176 from one slide 171 to the next, so that the guides 53 are locked against such in and out movement.

As most clearly shown in Fig. 13, the guide or trackway 176 is not perfectly concentric with the axis of rotation of the carrier 41, but is as a whole somewhat eccentric thereto, and somewhat irregular: viz., for about 90° from station N to station S, it is concentric with the carrier and is at a maximum distance from the center; for less than 90°, from station S past the loading station A to station C, it slopes inward toward the center and reaches its minimum distance therefrom; and for more than 90°, from station C to station N, its sections between successive slides 170 are further and further out from the center. It is in this latter portion of the travel of the carrier 41, from station C to station N, that winding of the leads l, l on the forms 50 may be done; and it will be seen, therefore, that at these successive stations from C to N the convolutions of the leads will be laid on the winding pins 51, 52 further and further out. This change or shift of the inner limits of movement of the guides 53 relative to the forms 50 from station to station corresponds substantially to the diameter of the two lead wires l, l that are laid on the pins 51, 52 side by side at successive convolutions, so that a perfectly regular skein is produced. As shown in Fig. 13, the (double) throw of the cranks 169 at the stations C to N is successively reduced in correspondence, substantially, with the location of the successive trackway sections 176 further and further out from the center, so that the outer limits of movement of the guides 53 relative to the forms 50 remain substantially the same.

In general, there is no objection to in and out motion of the guides 53 at stations after winding is completed, and no special provision is here illustrated for interrupting the driving connections from pinions 167 to cranks 169 at an idle station—though this might of course be done, if desired, by disconnecting crank 169 or pinion 167 from shaft 168. When this is not done, a substantial angle of slope of the form 50 (such as 28° or more) is especially advantageous, because it allows a wrap of the leads l, l more than 180° around the upper pin 52 (or 51) at their bends from which the leads extend to the tension clamps or guide 53; and this obviates slippage or shifting of the bends along the upper pins when the guides 53 move inward and outward at the idle station.

In the usual operation of the coiling machine, the lead wire skeins s are ejected or transferred from the machine at the station P, so that it is not necessary for the ejectors 96 to operate at any other points of their travel with the carrier 41. On the contrary, provision may be made to lock the ejectors 96 against outward movement throughout the rest of their travel; and for this purpose, the ejector rods 97 are shown provided with heads or blocks 179 that engage behind an annular locking rail or track 180 (shown in Figs. 2, 3, 4, 6, 7) which extends practically all the way around the machine above the rail 140, with a gap at the station P (only) to permit operation of the ejectors there. The rail 180 may be supported by brackets 182 from the annular rail 140.

When each coiling device 40 pauses or halts with the carrier 41 at the station P, its ejector 96 is pushed outward and to the right by its rod 97 as shown in Fig. 7, so as to push the wound skein s off the winding pins 51, 52. To do this the rod 97 may be actuated from inside the turret 41 by a pusher or reciprocator 190 operated by one arm of a rocker-lever 191 fulcrumed on a bracket 192 attached to the rail 140, Figs. 7 and 18. As shown in Figs. 7, 18, and 19, the pusher 190 is a slide-block movable in radial guideways 193 attached to the rails 140 and 180, and having a transverse groove 194 in which the ejector-rod head 179 engages; and this block 190 has pivoted thereto a block 196 that slides in the slotted arm of the rocker 191. For actuating the rocker 191, there is shown in Figs. 7, 17, and 18 a cam 197 mounted on the upright shaft 125 below the table 102 and having a lateral groove 198. The cam 197 actuates the rocker 191 through a bell-crank rocker 200 whose pivot shaft 201 extends through the table 102 in a bearing sleeve 202 and whose upper arm above the table is connected to the rocker 191 by a link rod 203, while its lower arm below the table carries a roller 204 engaged in the cam groove 198.

In removing or ejecting wound skeins from the coiling devices 40, it is desirable or necessary to release the downward extending end portions of the leads l, l from the corresponding guides 53. For this purpose, the gripping or clamping jaws 65, 66, 65 of each guide 53 may be opened at station P as or just before its ejector rod 97 is operated by actuation of the plunger 82. As shown in Figs. 7, 18, and 20, this is done by a slide 209 movable in radial ways 210 on the table 102 and carrying an adjustable abutment screw 211 (with a lock-nut 212) for engaging the plunger 82, as well as a block 213 pivoted thereto. As shown, the block 213 slides in the slotted upper arm of a bell-crank rocker 214 whose pivot shaft 215 extends down through a bearing in the table 102, Figs. 18 and 20. The rocker 214 may be actuated by the cam 197 (already mentioned) through a link-rod connection 216 from its lower arm (below the table 102) to a lever 217 fulcrumed on the table 102 at 218 and carrying a roller 219 that engages in the cam groove 198, Figs. 7, 14, 17, 18. To facilitate the disengagement of the downward extending leads l, l from the jaws 65, 66, 65, each guide 53 may be levelled and held level when it approaches and passes the station P, by means of a horizontal cam-track or rail 221 (similar to the track 118) attached to the table 102 by bracket arms 222, Figs. 2, 7, 13.

As hereinbefore set forth, the winding devices 40 have their component oscillatory forms 50 and reciprocating guides 53 periodically operated (at each active station) from the shaft 111, by the cams 122, 162 acting through the actuator gears 120, 160 and the oscillators 131 and reciprocators 171, and the carrier-actuating (or indexing) wheel 108 is driven from this shaft. From this same shaft 111 is also driven the shaft 125 whence the skein-ejectors 96 are operated (at station P) by the cam 197, which cam also opens the clamps 65, 66, 65 at this station. By suitable correlative design and setting of the various cams and connections (as here illustrated), the forms 50 and guides 53 of the winding devices 40 are operated in suitable alternation or correlation with each other—at intervals in the movement of the rotary carrier 41, and in definite relation thereto—to wind successive figure-8 convolutions during successive pauses in the (stepwise) carrier movement, and thus to periodically wind skeins of the desired number of such convolutions; and the ejectors 96 are successively operated, in correlation with the corresponding winding devices 40, to intermediately eject the wound skeins from said winding devices.

Between successive operations, during the movement of the carrier 41, the winding devices 40 (forms 50 and guides 53) and ejectors 96 are locked against operation by the coaction of the trackways or rails 140, 176, 180, extending along adjacent the paths of movement of the corresponding operators 138, 64, 97, with these operators. These operators 138, 64, 97 are operatively connected to the corresponding oscillator 131 and the reciprocators 171, 190, and disconnected therefrom, by their movement with the carrier. Not only are the clamps 65, 66, 65 of the guide 53 periodically opened or released at the station P by means of the cam 197, but they are also periodically released or relaxed by means of the cam track 117 at the place in their travel with the carrier 41 where they are passing the stations A, B. During their travel past the stations A, B, and P, also, the clamps 65, 66, 65 are levelled by the cam tracks 118 and 221.

Having thus described our invention, we claim:

1. Winding mechanism of the character described comprising an oscillatory winding form having spaced winding members extending in the general direction of its axis of oscillation, and also having a detonator holder between said winding members; and a winding guide for the lead-wires of a detonator in said holder movable in the general direction of the said form axis from and toward the form, and including wire-holding jaws with their opening presented outward, away from the form, for sidewise insertion and withdrawal of the wires.

2. Winding mechanism of the character described comprising an oscillatory winding form with spaced winding members extending in the general direction of its axis of oscillation; and a detonator lead-wire guide for cooperating with said form movable in the general direction of said axis from and toward the form, and including means for holding lead-wires severally at different positions lengthwise of said winding members, so that in each convolution they shall be wound side-by-side on the members.

3. Winding mechanism of the character described comprising an oscillatory wire-winding form with wire-engaging outer ends extending in the general direction of its axis of oscillation, and a wire-winding guide for cooperating with said form movable in the general direction of said axis from and toward the form, with means for maintaining tension on the wire during winding thereof on the form by said guide, an outer wire-engaging end of said form having a surface of elastic friction material for preventing sideslip along said end of a bend of wire therearound during movement of the winding guide away from the form.

4. Winding mechanism of the character described comprising an oscillatory winding form with spaced winding members extending in the general direction of its axis of oscillation; and a wire winding guide for cooperating with said form movable in the general direction of the form axis from and toward the form, and including friction clamps for yieldingly gripping the wire to be wound and maintaining tension thereon during winding.

5. Winding mechanism of the character described comprising an oscillatory winding form with spaced winding members extending in the general direction of its axis of oscillation; and a detonator lead-wire guide for cooperating with said form movable in the general direction of said axis from and toward the form, and including clamps for separately and yieldingly gripping the lead-wires and thus assuring proper tension on both of them during winding, regardless of inequalities in the sizes of the wires.

6. Winding mechanism of the character described comprising an oscillatory winding form having spaced winding members extending in the general direction of its axis of oscillation, and also having a detonator holder between said winding members; and a winding guide for the lead-wires of a detonator in said holder movable in the general direction of the said form axis from and toward the form, and including clamps for separately and yieldingly gripping the lead-wires at different positions lengthwise of said winding members and causing them to wind side-by-side on the members with proper tension on both wires, said clamps presenting their openings outward, away from the form, for sidewise insertion and withdrawal of the wires.

7. Winding mechanism of the character described comprising an oscillatory winding form with spaced winding members extending in the general direction of its axis of oscillation; and a winding guide for cooperating with said form movable in the general direction of said axis from and toward the form, and including wire-clamping jaws with their opening presented outward in said direction, away from the form, stop means associated with said jaws for limiting insertion of wire sidewise into them, and means also associated with said jaws for holding the wire in the jaws substantially against said stop means.

8. Winding mechanism of the character described comprising an oscillatory winding form with spaced winding members extending in the general direction of its axis of oscillation; and a detonator lead-wire guide for cooperating with said form movable in the general direction of said axis from and toward the form, and including tension clamps, for yieldingly and separately gripping the lead-wires, mounted side-by-side and rockable about an axis between them that extends in the general direction of said form axis.

9. Winding mechanism of the character described, for winding figure-8 skeins, comprising an oscillatory winding form with its axis of oscillation extending horizontally, and with a pair of spaced-apart winding members extending in the general direction of said axis at opposite sides thereof, and lying on a substantial slope at one extreme of the oscillation of the form; and a winding guide below the form movable in the general direction of the said form axis from and toward the form, in a vertical plane that lies between said winding members of the form when the form is at said extreme of its oscillation.

10. Winding mechanism of the character described, for winding figure-8 skeins, comprising an oscillatory winding form with its axis of oscillation extending horizontally, and with a pair of spaced-apart winding members extending in the general direction of said axis at opposite sides thereof, and lying on a substantial slope at one extreme of the oscillation of the form; and a detonator lead-wire guide below the form movable in the general direction of said axis from and toward the form, in a vertical plane that lies between said winding members of the form when the form is at said extreme of its oscillation, and including tension clamps, for yieldingly and separately gripping the lead-wires at different positions in the general direction of said axis, mounted side by side and rockable about an axis between them that extends in the general direction of said axis.

11. Winding mechanism of the character described comprising an oscillatory winding form with spaced winding members extending in the general direction of its axis of oscillation; a winding guide for cooperating with said form movable in the general direction of said axis from and toward the form, and comprising friction clamps for yieldingly gripping wire to be wound on the form; and means for maintaining said guide at substantially constant distance from the winding member to which the wire extends from said guide, during the inward movement of the guide toward the winding form.

12. Winding mechanism of the character described comprising an oscillatory winding form with spaced winding members extending in the general direction of its axis of oscillation; a winding guide for cooperating with said form; a swinging support for said winding guide pivoted about an axis substantially in line with a winding member of the form, when such member is at the extreme of its movement which is further from the guide; and an operator for said winding guide movable in the general direction of said axis, from and toward the form, with means of connection between said operator and said guide-support permitting movement of the guide sidewise relative to its said operator.

13. Winding mechanism of the character described comprising an oscillatory winding form having spaced winding members extending in the general direction of its axis of oscillation, and also having a detonator holder; a winding guide for the lead-wires of a detonator in said holder movable in the general direction of said axis from and toward the form; and a coil or skein ejector associated with said winding form movable in the direction of its winding members, and provided with means for releasing the detonator from said holder when ejecting the wound coil or skein of its lead-wires from the form.

14. In winding mechanism of the character described, the combination of an oscillatory winding form having spaced winding members extending in the general direction of its axis of oscillation; a winding guide for cooperating with said winding form movable in the general direction of said axis from and toward the form; a skein ejector associated with said winding form movable in the direction of its winding members; means for oscillating said winding form and moving said guide to and fro, to wind figure-8 skein convolutions on said form; and means for periodically actuating said ejector to eject wound skeins from said form.

15. In a winding mechanism of the character described, the combination of an oscillatory winding form having its axis of oscillation horizontal and having a pair of spaced winding members extending in the general direction of its said axis at opposite sides thereof, and lying on a substantial slope at one extreme of the oscillation of the form, and also having a detonator holder; a winding guide for cooperating with said winding form movable from and toward the form below the same in the general direction of its said axis, in a vertical plane that lies between said winding members when the form is at said extreme of its oscillation, and including tension clamps for yieldingly and separately gripping the lead-wires of detonators in said holder at different positions lengthwise of said winding members, said clamps being mounted side by side and rockable about an axis between them that extends in the general direction of said form axis, and presenting their opening outward in said direction, away from the form; means for maintaining said guide and clamps at substantially constant distance from the winding member to which the wire extends from said guide, during the inward movement of the guide and clamps toward the winding form; a skein ejector associated with said winding form movable in the direction of its said winding members, and provided with means for releasing a detonator from said holder; means for oscillating said winding form and moving said guide as aforesaid, to wind lead-wires of detonators in said holder into skeins of figure-8 convolutions on said form; and means for periodically operating said ejector to eject wound skeins and their detonators from said winding form and detonator holder.

16. In winding mechanism of the character described, the combination of an oscillatory winding form with spaced winding members extending in the general direction of its axis of oscillation; tension clamping means for the wire to be wound movable in the general direction of said axis from and toward the form, and opening outward in said direction, away from the form, when opened; a skein ejector associated with said winding form and movable in the direction of its winding members; means for periodically oscillating said winding form and moving said tension clamping means as aforesaid, to wind figure-8 convolutions on said form; means for periodically operating said ejector to eject wound skeins from said form; and means for opening said clamping means during the operation of said ejector.

17. In winding mechanism of the character described, the combination of an oscillatory winding form having spaced winding members extending in the general direction of its axis of oscillation, and also having a detonator holder; a winding guide for cooperating with said winding form movable in the general direction of said axis, from and toward the form, and including tension clamps, for yieldingly and separately gripping the lead-wires of detonators in said holder, mounted side-by-side and rockable about an axis between them that extends in the general direction of said form axis; means for maintaining said clamps at substantially constant distance from the winding member to which the wire extends from said clamps, during the inward movement of the guide and clamps toward the winding form; a skein ejector associated with said winding form movable in the general direction of its winding members, and provided with means for releasing a detonator from said holder; means for oscillating said winding form and moving said guide as aforesaid, to wind lead-wires into skeins of figure-8 convolutions on said form; means for periodically operating said ejector to eject wound skeins and their detonators from said winding form and detonator holder; means for periodically releasing said clamps for insertion and ejection of detonator lead-wires; and means for bringing said clamps to definite angular positions when released.

18. In a winding machine of the character described, the combination with a supporting wall portion of the machine, of a winding device thereon constructed to wind figure-8 skeins and including an oscillatory winding form presented at the outer side of said wall portion and having a shaft mounted in a rotational bearing on said wall portion, with an operating connection to its inner side, and a reciprocatory winding guide presented at the outer side of said wall portion, for coacting with said winding form, and movable in the general direction of the shaft axis, with an operator for said guide mounted in a slide-bearing on said wall portion and extending to its inner side.

19. In a winding machine of the character described, the combination with a supporting wall portion of the machine, of a winding device thereon constructed to wind figure-8 skeins and including an oscillatory winding form and a reciprocatory winding guide for coacting therewith, both presented at the outer side of said wall portion, and provided, respectively, with oscillating and reciprocating operating means extending through said wall portion to its inner side and having engagement means for sliding engagement with coacting actuating parts of the machine behind said wall portion.

20. In a winding machine of the character described, the combination with a supporting wall portion of the machine, of a winding device thereon constructed to wind figure-8 skeins and including an oscillatory winding form presented at the outer side of said wall portion and having a shaft axis mounted in a rotational bearing on said wall portion, with an operating connection to its inner side; a reciprocatory winding guide presented at the outer side of said wall portion, for coacting with said winding form, and movable in the general direction of said shaft axis, with an operator for said guide mounted in a slide-bearing on said wall portion and extending to its inner side; a swinging support carrying said winding guide pivoted to said wall portion of the machine above said shaft axis and substantially in line with a wire-bending portion of the form when said form portion is at the extreme of its movement which is further from the guide; and means of connection between said operator and said guide permitting movement of the guide sidewise relative to the operator.

21. In a winding machine of the character described, the combination with a supporting wall portion of the machine, of a winding device thereon constructed to wind figure-8 skeins and including an oscillatory winding form and a reciprocatory winding guide for coacting therewith, presented at the outer side of said wall portion and provided, respectively, with oscillating and reciprocating operating means extending through said wall portion to its inner side, and a skein ejector at the outer side of said wall portion associated with said winding form and having an operator extending through said wall portion to its inner side.

22. In a winding machine of the character described, the combination with a supporting wall portion of the machine, of a winding device thereon constructed to wind figure-8 skeins and including an oscillatory winding form presented at the outer side of said wall portion, and having a hollow shaft-axis mounted in a rotational bearing on said wall portion, with an operator for said winding form at the inner side of said wall portion mounted in a rotational bearing on said wall portion and operatively connected to said hollow shaft-axis of said winding form; a reciprocatory winding guide presented at the outer side of said wall portion, for coacting with said winding form, movable in the general direction of said shaft-axis and having an operator mounted in a slide-bearing on said wall portion and extending to its inner side; and a skein ejector at the outer side of said wall portion coacting with said winding form and having an operator extending through its hollow shaft-axis to the inner side of said wall portion.

23. In a machine of the character described, the combination of an upright turret structure; winding devices on said turret structure, around its circumference, constructed to wind in figure-8 skeins the lead-wires of loaded detonators associated with said winding devices; and shields projecting from the turret structure between said winding devices, for preventing explosion of any such detonator from setting off another such detonator.

24. In a machine of the character described, the combination of an upright turret structure; winding devices on said turret structure, around its circumference, constructed to wind figure-8 skeins; and means within said turret structure for operating said winding devices.

25. In a machine of the character described, the combination of an upright turret structure; winding devices on said turret structure, around its circumference, constructed to wind figure-8 skeins; skein ejectors associated with said winding devices; and actuating means within and associated with said turret structure correlated to operate said winding devices to periodically wind figure-8 skeins thereon, and said ejectors to intermediately eject the wound skeins from the winding devices.

26. In a machine of the character described, the combination of an upright turret structure; winding devices thereon around its circumference, comprising oscillatory winding forms with their axes of oscillation extending substantially radially thereof, and winding guides for said forms below the latter movable in the general direction of said axes; and means for operating said winding devices to wind figure-8 convolutions on said forms, comprising means for periodically oscillating said forms and moving said guides inward and outward, from and toward the forms, including actuators mounted to turn about axes substantially coaxial with the turret structure.

27. In a machine of the character described, the combination of a frame comprising a table; an upright turret structure on said table; winding devices on said turret structure, around its circumference, comprising oscillatory winding forms with their axes of oscillation extending substantially radially of the turret structure, and winding guides movable in the general direction of said axes; and means on the table inside said turret structure for operating said winding devices to wind figure-8 convolutions on said forms, comprising radially extending oscillators for said winding forms and radially reciprocating slides for reciprocating said guides, with rotatable actuators for said slides.

28. In a machine of the character described, the combination of an upright rotary turret structure, and means for rotating it; winding devices on said turret structure, around its circumference, comprising oscillatory winding forms with operators extending into the turret, and winding guides movable in the general direction of the axes of oscillation of the forms and having operating connections into the turret; and means for oscillating said form operators and reciprocating said guide-operating connections from inside the turret, at intervals in its rotation, and in alternation with one another, and thereby winding figure-8 convolutions on said forms.

29. In a machine of the character described, the combination of an upright rotary turret structure, and means for rotating it; winding devices on said turret structure, around its circumference, comprising oscillatory winding forms with operators extending into the turret, and winding-guides movable in the general direction of the axes of oscillation of the forms and having operating connections into the turret; means for oscillating said form operators and reciprocating said guide-operating connections from inside the turret, at intervals in its rotation, and in alternation with one another, and thereby winding figure-8 convolutions on said forms; and means inside the turret cooperating with said operators and operating connections to lock said winding forms and guides against operating movement during the intervals between their periodic operations as aforesaid.

30. In a machine of the character described, the combination of an upright rotary turret structure, and means for rotating it; oscillatory winding forms on said turret structure, around its circumference, with operators extending into the turret; winding guides on said turret structure, for cooperating with said forms, movable in the general direction of the axes of oscillation of the forms, and including tension clamps that present their openings outward from the turret, and also having operating connections into the turret; form oscillators and guide reciprocators in the turret, arranged to be operatively connected to the said form operators and guide-operating connections, and disconnected therefrom, by the movement of said operators and operating connections with the turret; and means for releasing said tension clamps at certain places in their travel with the turret.

31. In a machine of the character described, the combination of a frame comprising a table; an upright rotary turret structure mounted on said table, and means for rotating said turret structure stepwise; winding devices on said turret structure around its circumference comprising oscillatory winding forms, and detonator lead-wire guides below said forms movable in the general direction of the axes of oscillation of the forms and including tension clamps for yieldingly and separately gripping the lead-wires, mounted side by side and rockable about axes that extend in the same general direction; means mounted on said table within said turret structure for oscillating said winding forms and moving said guides and clamps inward and outward, during pauses in the turret movement, to wind figure-8 convolutions on said forms; means on the table for levelling said guide means and tension clamps during portions of their travel with the carrier; and means on said table for releasing said tension clamps while thus levelled.

32. In a machine of the character described, the combination of an upright rotary turret structure, and means for rotating it; winding devices on said turret structure, around its circumference, comprising oscillatory winding forms with operators extending into the turret, and wire-winding guides movable in the general direction of the axes of oscillation of the forms, and opening outward from the turret for sidewise insertion and removal of wires to be wound on the forms, and also having operating connections into the turret; skein ejectors on the turret structure associated with said winding forms and movable in the general direction of the form axes, and having operators extending into the turret; means for oscillating said form operators and reciprocating said guide-operating connections from inside the turret, at intervals in its rotation, and in alternation with one another, to wind the wires in skeins of figure-8 convolutions on the forms; and means for actuating said ejector operators from inside the turret to eject the wound skeins from the forms.

33. In a machine of the character described, the combination of a frame comprising a table; an upright rotary turret structure mounted on said table, and means for rotating said turret structure mounted on the table inside the turret; winding devices on said turret structure, around its circumference, comprising oscillatory winding forms with operators extending into the turret, and winding guides movable in the general direction of the axes of oscillation of the forms, and having operating connections into the turret; winding-device actuating means on the table inside the turret, for oscillating said form operators and reciprocating said guide-operating connections, including a common rotatable actuator for said operators and individual reciprocators for said guide-operating connections, with individual rotatable actuators therefor; and means beneath the table for driving said turret-rotating means and said winding-device actuating means, including a common rotatable actuator for said individual reciprocator actuators.

34. In a machine of the character described, the combination of a moving carrier, and means for moving it; winding devices on said carrier comprising oscillatory winding forms, and winding guides for cooperating with said forms movable in the general direction of their axes of oscillation; and means for operating said winding devices to wind figure-8 convolutions on the forms, comprising means for oscillating the winding forms at intervals in the movement of the carrier, and means for correlatively moving the corresponding winding guides away from and toward said forms.

35. In a machine of the character described, the combination of a moving carrier, and means for moving it; winding devices on said carrier comprising oscillatory winding forms, and winding guides with tension clamps for the wire to be wound reciprocable in the general direction of the axes of oscillation of the forms; means for oscillating said forms and reciprocating said guides, in alternation, at intervals in the movement of said carrier, to wind the wire in figure-8 convolutions on the forms; and means for releasing said clamps at certain places in their travel with the carrier.

36. In a machine of the character described, the combination of a moving carrier, and means for moving it; oscillatory winding forms on said carrier with spaced winding members extending in the general direction of the axes of oscillation of the forms; tension clamps for the wire to be wound mounted on said carrier for reciprocation in the general direction of said axes, and to rock about axes extending in the same general direction; means for periodically oscillating said forms and reciprocating said clamps; cam track means adjacent their path or movement for levelling said clamps during portions of their travel with the carrier; means for limiting the rocking of said clamps relative to the carrier, so that they shall engage said cam track means properly; and means for periodically releasing said clamps, while they are levelled as aforesaid.

37. In a machine of the character described, the combination of a moving carrier, and means for moving it; winding devices on said carrier comprising oscillatory winding forms with axes of oscillation extending crosswise of the path of movement of the carrier, and winding guides for cooperating with said forms movable in the general direction of said axes, and opening away from the carrier for sidewise insertion and withdrawal of wires to be wound on the forms; skein ejectors on said carrier associated with said winding forms and movable in the general direction of their said axes; means for oscillating said forms and reciprocating said guides, in alternation, at intervals in the movement of the carrier, to wind the wires in skeins of figure-8 convolutions on the forms; and means for operating said ejectors, successively, to eject the wound skeins from the forms, the latter pass a point in their travel with the carrier.

38. In a machine of the character described, the combination of a moving carrier, and means for imparting step-by-step movement thereto; winding devices thereon constructed to wind figure-8 skeins; and means for operating said winding devices during the successive pauses in the carrier movement to wind successive figure-8 skein convolutions on said devices.

39. In a machine of the character described, the combination of a moving carrier, and means for imparting step-by-step movement thereto; winding devices thereon comprising oscillatory winding forms with spaced winding members extending in the general direction of their axes of oscillation, and winding guides movable in the general direction of said axes from and toward the forms; means for operating said winding devices to wind figure-8 convolutions on said forms, comprising means for periodically oscillating said forms and moving said guides as aforesaid, in definite relation to the movements of the carrier; and means for changing a limit of the movement of the guide means relative to the winding forms when the carrier is moved.

40. In a machine of the character described, the combination of a moving carrier, and means for imparting step-by-step movement thereto; winding devices thereon comprising oscillatory winding forms with operators for oscillating them, and winding guides movable in the general direction of the form axes from and toward the forms, and provided with operators for so moving them; and means for operating said winding devices to wind figure-8 convolutions on said forms, during pauses in the carrier movement, comprising form oscillators and guide reciprocators arranged to be operatively connected to the corresponding operators, and disconnected therefrom, by movements of the operators with the carrier.

41. In a machine of the character described, the combination of a moving carrier; winding devices mounted thereon at intervals, and constructed to wind figure-8 skeins; means for moving the carrier in steps corresponding to the intervals between said winding devices; means adjacent the path of said carrier for operating said winding devices, during the successive pauses in the carrier movement, to wind successive figure-8 skein convolutions on said forms; and means for locking said winding devices against operation during movement of the carrier.

42. In a machine of the character described, the combination of a moving carrier, and means for imparting step-by-step movement thereto; winding devices thereon comprising oscillatory winding forms with shaft axes and operators extending crosswise of the path of movement of the carrier, and winding guides movable in the general direction of said axes from and toward the forms, and provided with operators for so moving them; means for operating said winding devices to wind figure-8 convolutions on said forms, during pauses in the carrier movement, comprising means for cooperating with said operators to oscillate said forms and reciprocate said guides; and means comprising trackways extending along adjacent the paths of movement of said operators for coacting with these operators to lock said winding forms and guides against operation during movement of the carrier, and to shift a limit of movement of the guide means relative to the winding forms when the carrier is moved.

43. In a machine of the character described, the combination of a moving carrier, and means for imparting step-by-step movement thereto; oscillatory winding forms thereon, with operators for oscillating them; winding guides, with tension clamps for the wires to be wound, mounted on said carrier for movement in the general direction of the axes of oscillation of the forms, and to rock about axes extending in the same general direction, and provided with operators for moving them as aforesaid; means for operating said winding devices to wind figure-8 convolutions on said forms, during pauses in the carrier movement, including form oscillators and guide reciprocators arranged to be operatively connected to the corresponding operators and disconnected therefrom by movements of the operators with the carrier; cam track means adjacent their path of movement for levelling said tension clamps during portions of their travel with the carrier; and means for periodically releasing said clamps, while they are levelled as aforesaid.

44. In a machine of the character described, the combination of a moving carrier, and means for imparting step-by-step movement thereto; winding devices thereon constructed to wind figure-8 skeins; skein ejectors associated with said winding devices; means adjacent the path of said carrier for operating said winding devices and ejectors, during the successive pauses in the carrier movement, to wind successive figure-8 skein convolutions on said devices, and to eject wound skeins from the devices; and means to lock said winding devices and ejectors against operation during movement of the carrier.

45. In a machine of the character described, the combination of a moving carrier, and means for imparting step-by-step movement thereto; winding devices thereon comprising oscillatory winding forms with operators for oscillating them, and winding guides movable in the general direction of the axes of oscillation of the forms and provided with operators for so moving them; skein ejectors associated with said winding forms, and having operators coaxial with the forms; and means for operating said winding devices to wind figure-8 convolutions on said forms and for operating said ejectors to eject wounds skeins from the forms, during pauses in the carrier movement, including form oscillators, guide reciprocators, and ejector reciprocators arranged to be operatively connected to the corresponding operators and disconnected therefrom by movements of the operators with the carrier.

46. In a machine of the character described, the combination of a moving carrier, and means for imparting step-by-step movement thereto; oscillatory winding forms thereon, with operators for oscillating them; winding guides with tension clamps for the wires to be wound mounted on said carrier for movement in the general direction of the axes of oscillation of the forms and to rock about axes extending in the same general direction, and provided with operators for moving them as aforesaid; ejectors associated with said winding forms and provided with operators; means for operating said winding forms and guides to wind figure-8 convolutions on said forms, and for operating said ejectors to eject wound skeins from the forms, during pauses in the carrier movement, including form oscillators, guide reciprocators, and ejector reciprocators arranged to be operatively connected to the corresponding operators and disconnected therefrom by movements of the operators with the carrier; cam track means adjacent their path of movement for levelling said tension clamps during portions of their travel with the carrier; and means for periodically opening said clamps, while they are levelled as aforesaid.

CHARLES R. JOHNSON.
EDWARD H. BAUGHMAN.

CERTIFICATE OF CORRECTION.

Patent No. 2,279,323. April 14, 1942.

CHARLES R. JOHNSON ET AL.

It is hereby certified that error appears in the printed specification of the above numbered patent requiring correction as follows: Page 11, second column, line 43, claim 37, after "forms," insert --as--; and that the said Letters Patent should be read with this correction therein that the same may conform to the record of the case in the Patent Office.

Signed and sealed this 23rd day of June, A. D. 1942.

(Seal)

Henry Van Arsdale,
Acting Commissioner of Patents.